(12) United States Patent
Nakamura et al.

(10) Patent No.: US 9,044,030 B2
(45) Date of Patent: Jun. 2, 2015

(54) APPARATUS AND METHOD FOR SUSPENDING SAUSAGE FROM HOOKS

(71) Applicant: HITEC Co., Ltd., Kanagawa (JP)

(72) Inventors: Tatsuo Nakamura, Kanagawa (JP); Takashi Kojima, Kanagawa (JP); Hideaki Arai, Kanagawa (JP); Takayuki Fujimaki, Kanagawa (JP)

(73) Assignee: HITEC Co., Ltd., Kanagawa (JP)

( * ) Notice: Subject to any disclaimer, the term of this patent is extended or adjusted under 35 U.S.C. 154(b) by 0 days.

(21) Appl. No.: 14/254,103

(22) Filed: Apr. 16, 2014

(65) Prior Publication Data

US 2014/0315477 A1    Oct. 23, 2014

(30) Foreign Application Priority Data

Apr. 17, 2013  (JP) .................................. 2013-086671

(51) Int. Cl.
A22C 15/00    (2006.01)

(52) U.S. Cl.
CPC .................................... *A22C 15/001* (2013.01)

(58) Field of Classification Search
USPC ..................... 452/30–33, 35–37, 46–48, 51
See application file for complete search history.

(56) References Cited

U.S. PATENT DOCUMENTS

| | | | | |
|---|---|---|---|---|
| 3,594,858 | A | * | 7/1971 | Simonsen ....................... 452/51 |
| 6,056,636 | A | * | 5/2000 | Cody et al. ..................... 452/51 |
| 6,086,469 | A | * | 7/2000 | Cody et al. ..................... 452/51 |
| 6,234,891 | B1 | * | 5/2001 | Maria Klaassen ............ 452/182 |
| 6,290,591 | B1 | | 9/2001 | Hergott et al. |
| 6,467,668 | B1 | * | 10/2002 | Basile et al. .................. 226/104 |
| 7,354,338 | B2 | * | 4/2008 | Nakamura et al. ............. 452/30 |
| 8,342,318 | B2 | * | 1/2013 | Knodel ......................... 198/683 |
| 8,708,783 | B2 | * | 4/2014 | Tamaki .......................... 452/51 |
| 8,795,038 | B2 | * | 8/2014 | Fischer et al. ................. 452/51 |

FOREIGN PATENT DOCUMENTS

| | | |
|---|---|---|
| JP | 2000-139331 A | 5/2000 |
| JP | 2011-050276 A | 3/2011 |
| WO | 02/05653 A2 | 1/2002 |

* cited by examiner

*Primary Examiner* — Richard Price, Jr.
(74) *Attorney, Agent, or Firm* — Bachman & LaPointe, P.C.

(57) ABSTRACT

Hook groups formed by hooks in a number identical to a maximum number of loops of sausage to be suspended from a stick are provided on a wrapping connector moving body of a conveyor with a respective hook absent zone interposed between adjacent ones of the hook groups. When the sausage is suspended from all the hooks of one hook group, the supply of the sausage to the conveyor is interrupted, and the sausage whose supply to the conveyor has been restarted after the hook absent zone moved a predetermined distance is suspended from a first hook of an ensuing hook group to form one loop by a last hook of the one hook group and a first hook of the ensuing hook group.

8 Claims, 11 Drawing Sheets

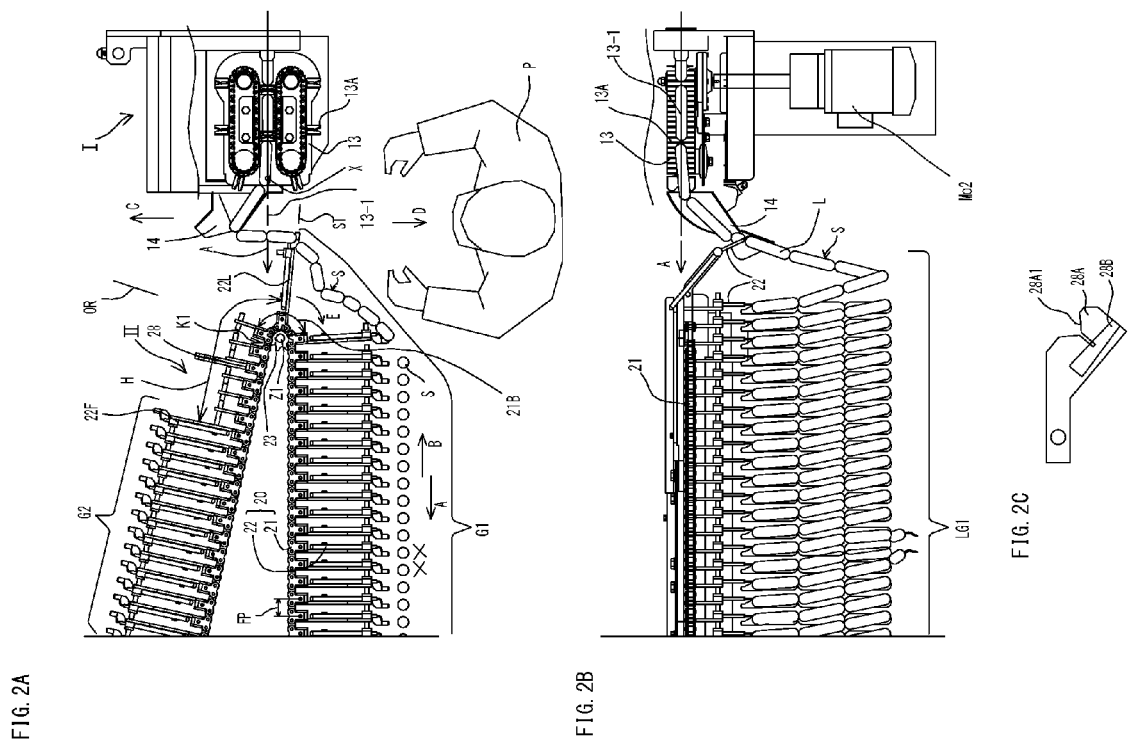

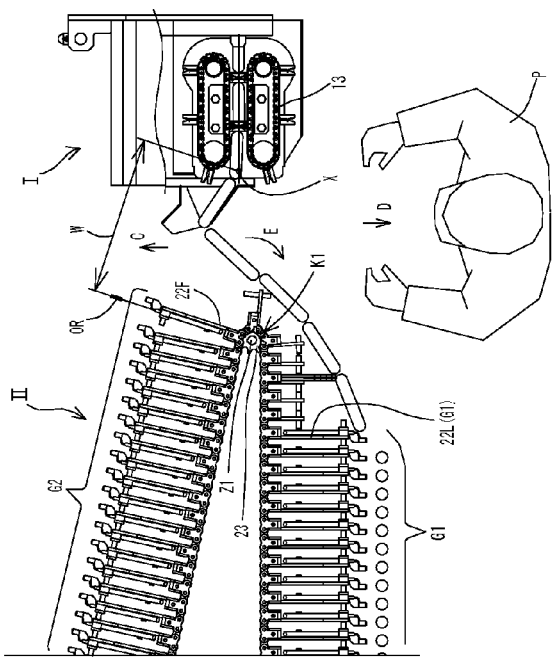
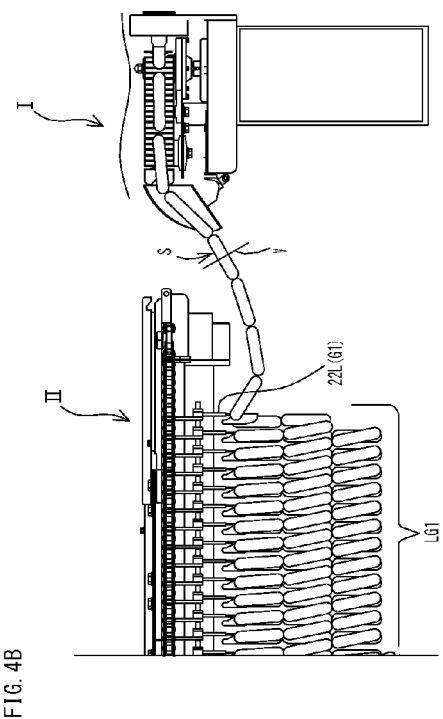
FIG. 4A
FIG. 4B

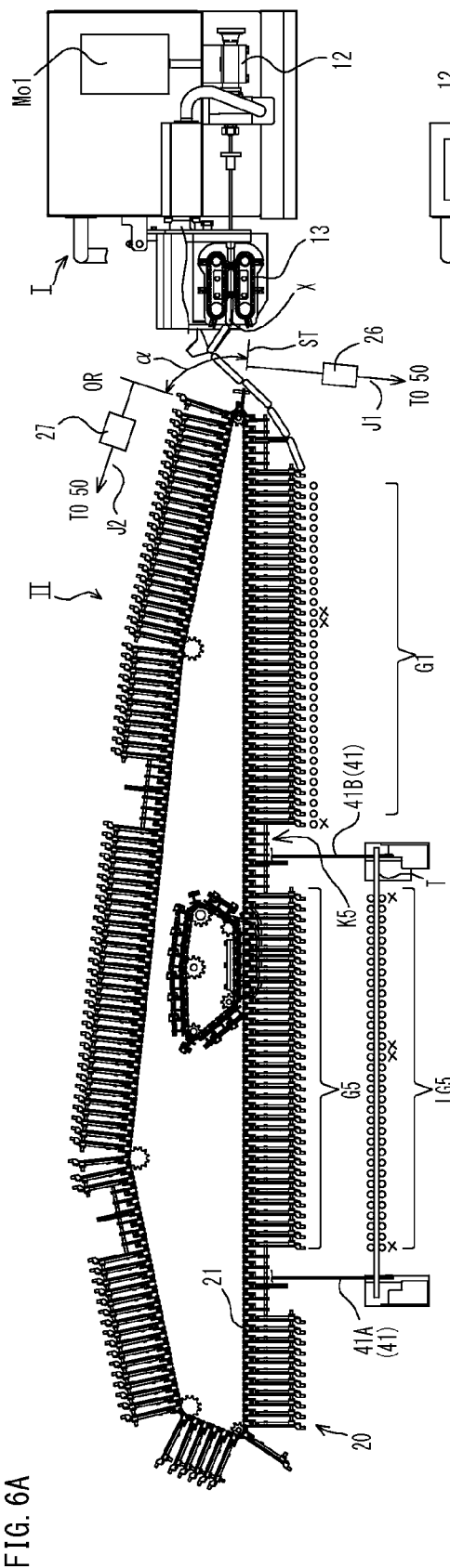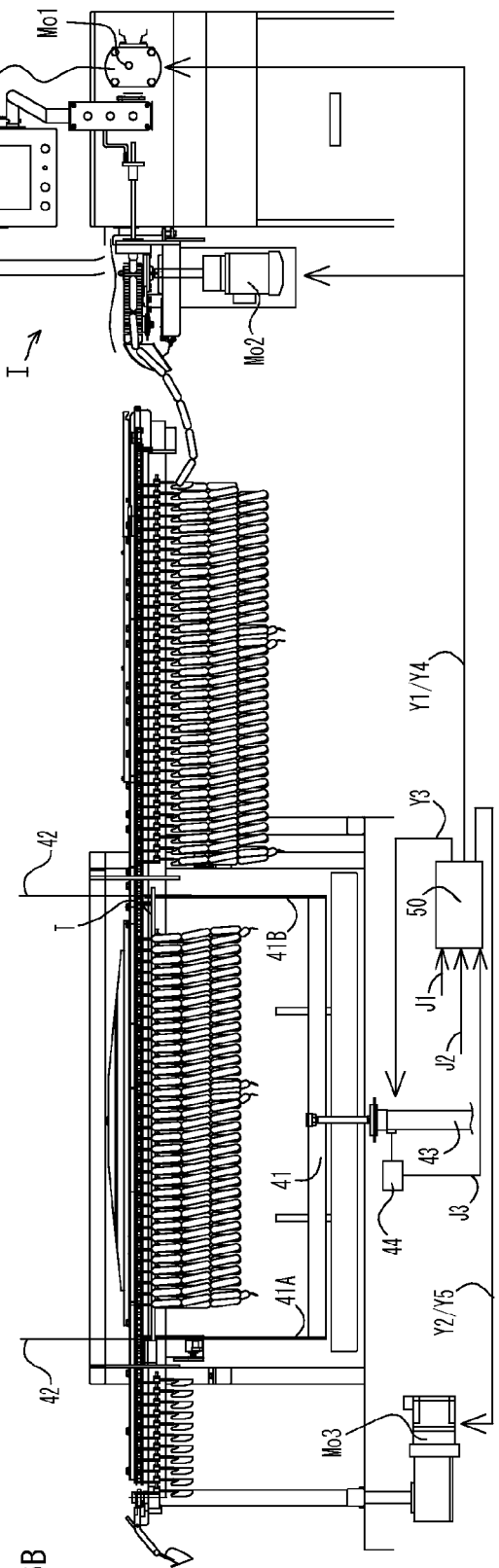
FIG. 6A
FIG. 6B

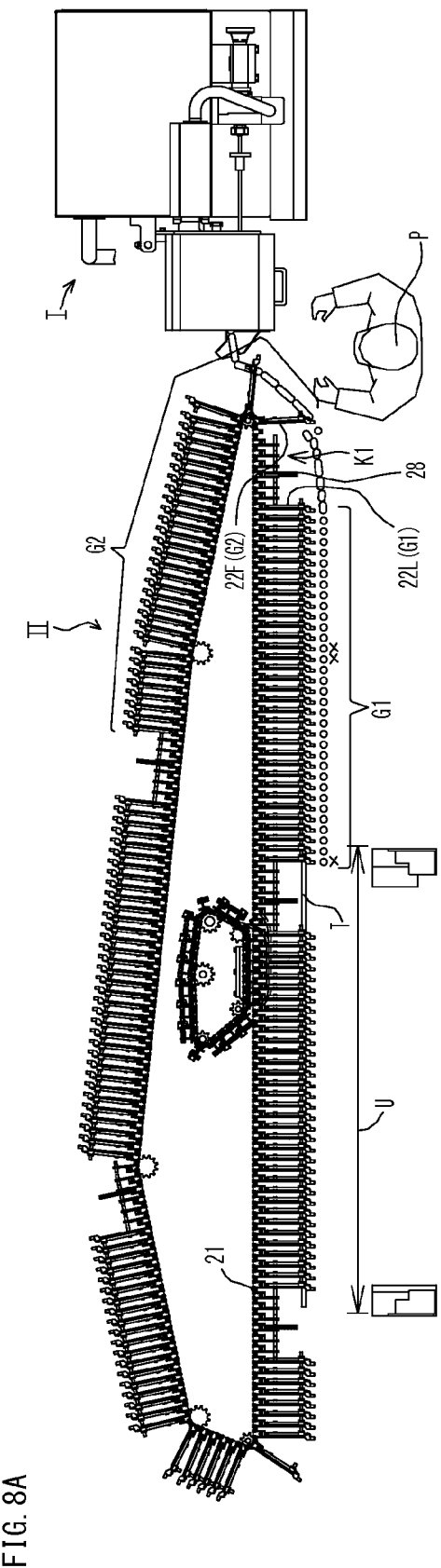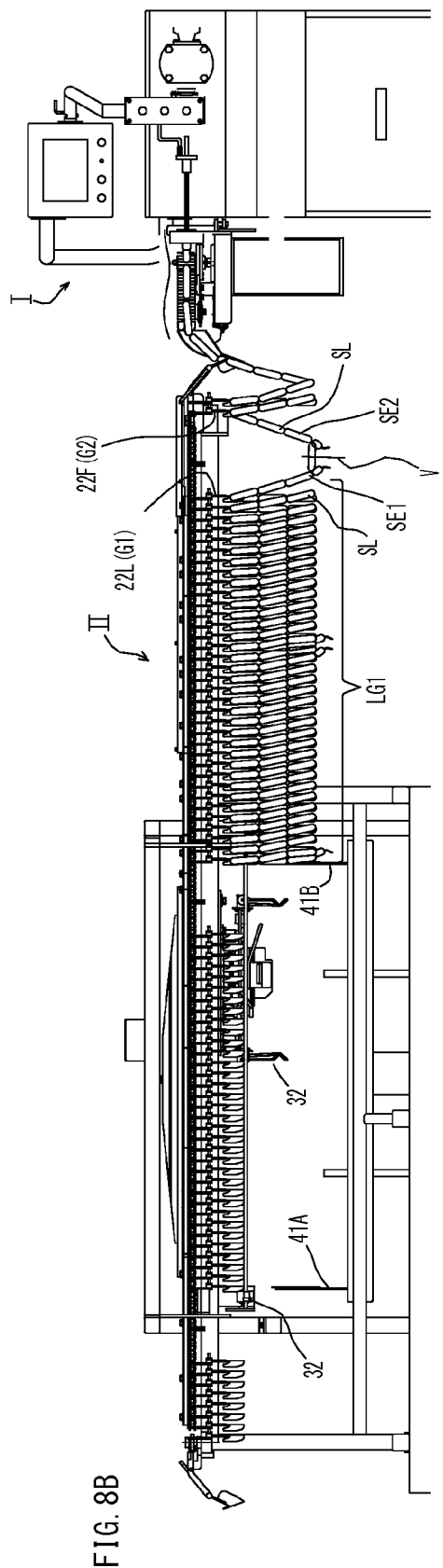
FIG. 8A
FIG. 8B ions in a smokehouse. A loop group of this predetermined number of loops is formed as the sausage which is made by stuffing a casing with a meat emulsion by a sausage stuffing machine F and formed into a chain of links is sequentially suspended in loop form from a multiplicity of hooks of a conveyor.

APPARATUS AND METHOD FOR SUSPENDING SAUSAGE FROM HOOKS

BACKGROUND OF THE INVENTION

1. Field of the Invention

The present invention relates to an apparatus and a method for suspending a sausage from hooks.

2. Description of the Related Art

An appropriate number of loops of sausage to be suspended from a stick which is used for heat treatment is determined by taking into consideration the productivity of heat treatment of sausage and the quality of sausage (smoke unevenness) in a smokehouse. A loop group of this predetermined number of loops is formed as the sausage which is made by stuffing a casing with a meat emulsion by a sausage stuffing machine F and formed into a chain of links is sequentially suspended in loop form from a multiplicity of hooks of a conveyor.

In the case of artificial casings whose overall length is fixed, a sausage obtained from one such casing is automatically formed into a predetermined number of loops and is suspended from the conveyor. Natural intestine casings, however, are indefinite in length and diameter, and therefore it is impossible to continuously make loop groups each having a fixed predetermined number of loops from each natural intestine casing.

Normally, two operators separately take charge of the operation of supplying natural intestine casings to a sausage stuffing machine, the operation of finishing the loops into a predetermined number of loops by combining sausage loops made from one or a plurality of (usually, one to three) natural intestine casings, and the operation of transferring the loop groups onto a stick.

In addition, as another method, an attempt is made to eliminate the manual operation of transferring sausage loops onto a stick by connecting to a stuffing machine a conveyor having a device for automatically transferring loop groups suspended from hooks onto a stick, so that a single operator of the stuffing machine takes charge of the operation ranging from the operation of supplying natural intestine casings to the sausage stuffing machine to the operation of finishing the loops suspended from hooks into loop groups of a predetermined number of loops.

A method and apparatus for manufacturing sausages by suspending loop groups of a predetermined number of loops from hooks are disclosed in JP-A-2000-139331 (Patent Document 1), WO 02/05653 A2 (Patent Document 2), and JP-A-2011-50276 (Patent Document 3).

In Patent Document 1, an apparatus is disclosed in which a sausage having the number of loops and the number of links which are adjusted in respectively fixed ranges is suspended from a suspension frame (22) for sausage heat treatment, and the number of links constituting each of the leading and trailing loops of a chain of sausage S is made smaller than the number of links constituting a respective one of other loops, to prevent the unwinding of the leading and trailing links.

In the known apparatus disclosed in this Patent Document 1, when the number of links to be suspended per suspension frame (22) has been reached approximately in the middle, other than both end portions, of the chain of sausage L which is being transferred by a hook conveyor (13), a connecting portion (SL) to be cut of the chain of sausage (S) is cut by a cutting device (31).

Patent Document 2 discloses a method and an apparatus in which one loop (39) consisting of a predetermined number of sausage (36)(eight in the embodiment) is sequentially hung by two adjacent hooks (10), and when the loops each consisting of the predetermined number of sausages (36) are hung on a predetermined number of hooks (10), the supply of the loop (39) consisting of the predetermined number of sausages (36) is interrupted, wherein, alternatively, a marker loop (39B and 39C in FIG. 8) (39A in FIG. 8A) whose shape underwent a change in shape in relation to the shape of the loop (39) consisting of the predetermined number of sausages (36) is supplied to the hook (10). In this known apparatus, the marker loop (39B and 39C in FIG. 8) (39A in FIG. 8A) is formed on the hook (10) while a sausage strand (34) is being discharged from a sausage linker assembly (74) toward a conveyor (58).

In the apparatus shown in FIG. 8 of the above-described Patent Document 2, the sausage strand (34) discharged from a discharge horn (62) is formed into a vertically short loop (39B) by moving the conveyor (58) at a higher speed.

In the apparatus shown in FIG. 8A of the above-described Patent Document 2, the marker loop (39A) having a V-shape and consisting of the same number of sausages (eight in the embodiment) as the predetermined number of sausages (36) is hung on a hook (10) adjacent via a space (92) to the hook (10) supporting an endmost loop of a sausage loop group (94).

In addition, Patent Document 3 discloses a method and an apparatus in which one operator performs the supply of casings to a stuffing machine and processing of sausage loops, and loops groups formed on a suspension member set consisting of a predetermined number of suspension members are automatically transferred onto a stick.

In the apparatus disclosed in Patent Document 3, a first suspension member (18F) of a suspension member set (19) of an upper conveyor (11) at a standstill at a removing place ST2 is opposed, at a long distance approximately corresponding to a set mounting region (17B), to a last suspension member (24E) of a suspension member set (25) of a lower conveyor (12) which is moving over a suspension member starting position (OP1) in a long (see Patent Document 3, FIG. 7-2 (E)).

However, with the apparatus disclosed in Patent Document 1, since an operator M is unable to visually confirm the portion of the loop to be cut, a thermally-fusing-portion indicating device (32) which is provided separately from the hook conveyor (13) is required, so that the apparatus correspondingly becomes complex.

In addition, with the apparatus of this Patent Document 1, although control of the number of links at both terminal loops is provided, control of the number of links of an intermediate loop other than both terminal loops is not provided. Since the loop which is cut by the thermally-fusing-portion indicating device (32) is an intermediate loop other than both terminal loops, the number of links of new terminal loops produced by the cutting of the loop is constantly fixed without being controlled. Hence, the manner of tying the new terminal loop is limited.

With the apparatus of FIG. 8 disclosed in Patent Document 2, since the conveyor is moved at a faster speed to form a short marker loop (39B) which is vertically short, the operator-s manual processing operation is difficult to catch up with the movement of the loop ends, and it is difficult to processing the end of sausages suspended from the hook.

Since the space (92) of the apparatus of FIG. 8A disclosed in Patent Document 2 is formed by using only one hook (10), the interval between the endmost loop and a loop adjacent thereto is narrow. For this reason, the operation of processing both ends produced by cutting the maker loop (39A) is difficult. Furthermore, care needs to be taken so as not to cause a stick (47) to be inserted in the adjacent loop, so that the operation of transferring the sausage loop group (94) onto a stick is time-consuming.

The apparatus disclosed in Patent Document 3 has a complex structure having the upper conveyor (11) and the lower conveyor (12). Further, with this known apparatus, since the distance from the first suspension member (18F) to the last suspension member (24E) is long, it is necessary for the first suspension member (18F) to move toward the suspension member starting position (OP1) at a speed higher than the moving speed of the conveyor persisting at the time of loop formation. For this reason, with the apparatus of Patent Document 3, the durability of endlessly circulating bodies (17, 23) to which the suspension member sets (19, 25) are fixed declines correspondingly, and a device for avoiding the collision of the first suspension member (18F, 24F) against the last suspension member (24E, 18E) is required, so that the apparatus becomes complex correspondingly.

SUMMARY OF THE INVENTION

The present invention has been devised in view of the above-described aspects, and it is an object of the present invention to provide an apparatus and a method for suspending sausage loops from hooks, which allow the operator to easily perform the loop processing operation, to thereby make it possible to form a sausage, made by a natural intestine casing nonuniform in length, into loop groups each formed by a predetermined number of loops and to be suspended from the conveyor in a short time, and which are high in productivity.

It is another object of the present invention to provide an apparatus and a method for suspending sausage loops from hooks, which allow the operator to easily perform the loop processing operation and, at the same time, permit loop formation in a short mechanical idle time, to thereby make it possible to form the sausage, made by a natural intestine casing nonuniform in length, into loop groups each formed by a predetermined number of loops and to be suspended from the conveyor in a short time, and which make it possible to reliably remove the loop groups automatically from the hook groups by a stick, and are labor-saving and high in productivity and reliability.

According to the present invention, the above-described objects are attained by the following apparatus and method for suspending sausage loops from hooks which are configured as described below.
<Apparatus for Suspending Sausage Loops from Hooks>

An apparatus for suspending sausage loops from hooks in accordance with the present invention comprises: a conveyor having a plurality of hooks for suspending a sausage in which a multiplicity of links are connected and an endless wrapping connector moving body on which the plurality of hooks are mounted at a predetermined pitch.

The above-described apparatus for suspending sausage loops from hooks is characterized in that a plurality of hook groups each formed by a number of hooks corresponding to a maximum number of sausage loops to be suspended from a stick are provided on the wrapping connector moving body with a respective hook absent zone interposed between adjacent ones of the hook groups, and that when the sausage which is being supplied to the conveyor is suspended from all the hooks from a first hook to a last hook of one of the plurality of hook groups provided on the wrapping connector moving body which is being moved in a downstream direction, the supply of the sausage to the conveyor is interrupted, and the sausage whose supply has been restarted after the hook absent zone moved a predetermined distance in a state in which the supply of the sausage to the conveyor is being interrupted is suspended from a first hook of an ensuing hook group following the one hook group.

According to the apparatus of the present invention thus configured, even if when the wrapping connector moving body is moved a predetermined distance in the state in which the supply of the sausage to the conveyor is being interrupted, the sausage between the sausage supplying device and a last hook of the hook group is pulled by the movement of the hook groups, and the suspended length of the sausage has run out, since the hook absent zone is provided, a situation does not occur in which the sausage whose suspended length of the sausage has run out rides over a hook. In consequence, the cutting of the sausage between the sausage supplying device and a hook group and the end processing after cutting can be performed without being hampered by the hooks even when the supply of the sausage to the conveyor is being interrupted, so that it is possible to suspend a loop group of a maximum number of loops from hooks in a short time, thereby making it possible to increase productivity in both sausage stuffing and sausage heat treatment. In addition, since one wrapping connector moving body has a plurality of hook groups, the apparatus becomes simple in structure.

Since, in a state in which the supply of the sausage to the conveyor is being interrupted, the hook absent zone moves a predetermined distance with respect to the sausage supplying position for supplying the sausage to the conveyor, the aforementioned number of links of a loop, which is formed by a last hook of one hook group and a first hook of an ensuing hook group adjacent via the hook absent zone to that first hook, can be determined irrespective of the moving speed of the hook absent zone. Therefore, the moving speed of the conveyor with the supply of the sausage to the conveyor being interrupted can be set to a desired speed to facilitate the operator's loop processing operation.

In the present invention, the apparatus may be configured such that when the supply of the sausage to the conveyor has finished in a state in which the loop group formed by loops in a number smaller than a minimum number of loops set for one hook group is suspended from the hooks of the one hook group, the movement of the wrapping connector moving body is stopped at that point of time, and when the supply of the sausage to the conveyor using an ensuing new sausage is started, the movement of the wrapping connector moving body is restarted to allow the ensuing new sausage to follow the loop group and to be suspended from the one hook group.

The above-described apparatus is capable of setting a minimum number of loops for one hook group, and when loops in a number between a minimum number of loops and a maximum number of loops which have been set are suspended from one hook group at the point of time of completion of the supply of sausage to the conveyor, the wrapping connector moving body moves downstream without waiting for the supply of an ensuing new sausage to the conveyor. In consequence, since a loop group exceeding the maximum number of loops is not made, the cutting operation of loops beyond the hook absent zone is unnecessary, so that the operator's operation time can be shortened, making it possible to speed up the production cycle. In addition, by setting a minimum number of loops, it is possible to secure the amount of sausages which are heat treated on one stick. Further, by setting a minimum number of loops, the number of loops to be suspended from one stick can be adjusted in correspondence with the length of natural intestine casings used (length including variations).

In the present invention, a section on the wrapping connector moving body between a position spaced apart one predetermined pitch toward a trailing side from the last hook of one hook group, on the one hand, and a position spaced apart the one predetermined pitch toward a side of the one hook group from the first hook of an ensuing hook group adjacent to and following the one hook group, on the other hand, may be set as the hook absent zone where the hooks are not mounted.

According to such a hook absent zone described above, since the hooks are not present at the position spaced apart one predetermined pitch toward the trailing side from the last hook of the one hook group and at the position spaced apart the one predetermined pitch toward the leading side from the first hook of an ensuing hook group adjacent to and following the one hook group, respectively, an allowable moving range of the last loop subjected to end processing can be secured, thereby making it possible to prevent the occurrence of entanglement of two loops. Further, since the length of the aforementioned section has a length of at least two predetermined pitches, it is possible to secure a space for the operator or a stick discharging member to lift the stick inserted in the loop.

In the present invention, when a preceding hook group preceding one hook group is present at a stick discharging position for removing the loop group by raising the stick inserted in the loop group suspended from the hook group, a first hook of an ensuing hook group adjacent to and following the one hook group may be adapted to be positioned in a state of opposing a sausage supplying position for supplying the sausage to the conveyor.

By adopting the above-described arrangement, since the first hook of an ensuing hook group is positioned at a position opposing the sausage supplying position at the point of time of resupply of the sausage to the conveyor, the first hook able to immediately suspend the sausage resupplied to the conveyor without moving the wrapping connector moving body by the mounting pitch portion of below-described null hooks, so that the mechanical idle time is short, and the loop reforming timing can be speeded up, resulting in high productivity.

In the present invention, the apparatus may be configured such that when the loop group suspended from the preceding hook group preceding the one hook group is removed from the hook group by the stick which is raised, the supply of the sausage to the conveyor is restarted.

By adopting the above-described arrangement, since the hook absent zone has a predetermined length in the moving direction of the wrapping connector moving body, it is possible to not only restart the supply of the sausage to the conveyor with the conveyor stopped but also restart the supply of the sausage to the conveyor being moved, with the result that the loop reforming timing can be speeded up, resulting in higher productivity.

In the present invention, the wrapping connector moving body may have a revolvingly moving zone for revolvingly moving in a horizontal plane from a rearward side toward a frontward side about a rotating shaft disposed downstream of a sausage supplying position in a direction of supplying the sausage to the conveyor and a linearly moving zone for moving downstream of the revolvingly moving zone. In addition, the sausage suspending apparatus may further comprise: a stick discharging member which moves on a stick discharging path intersecting the linearly moving zone to lift up the stick arranged along the linearly moving zone by a stick supporting member and to discharge the stick from the conveyor; and a stick discharge detecting means for detecting the completion of stick discharging from the conveyor by the stick discharging member. In addition, the sausage suspending apparatus may be configured such that when the hook absent zone adjacent to a preceding hook group preceding one hook group is present on the stick discharging path, a first hook of an ensuing hook group adjacent to and following the one hook group is arranged to be positioned on the rearward side in a state of opposing the sausage supplying position, and the first hook of the ensuing hook group may be adapted to suspend the sausage whose supply to the conveyor has been restarted on the basis of a detection signal from the stick discharge detecting means.

According to the above-described configuration, since the loop cutting/separation and end processing operation is easy to perform, only a single casing supplying operator becomes able to carry out the required processing operation within a required time. Additionally, when the stick discharge detecting means detects of the completion of stick discharge by the stick discharging member, the first hook of the ensuing hook group immediately suspends the sausage without moving the wrapping connector moving body by the mounting pitch portion of the null hooks, the mechanical idle time is short. As a result, by juxtaposing a stick discharging device having stick discharging members, it is possible for only one casing supplying operator to handle the suspension from hook groups of the loop groups each formed by a predetermined number of loops without allocating a stick discharging operator who also performs loop processing operation.

Also, according to the above-described configuration, since the sequence of the operation of automatic discharging of loop groups from hook groups and the restarting of sausage stuffing is provided for, the operation of the casing supplying operator proceeds in accordance with this automatic operation, with the result that the loop cutting/separation and end processing operation advances without delay, so that productivity improves.

In addition, according to the above-described configuration, since sufficient scales of size are secured for the allowable moving range of the sausage loops suspended from the hooks and the place for supporting the stick by the stick discharging member, it is possible to prevent such as causing damage to the loops by the stick discharging member and the dropping of the stick from the stick discharging member during the discharging of the sticks. In addition, there is no risk of an end of the stick from being caught by the sausage of an adjacent loop group, so that only the loop group at the stick discharging position can be removed from the hook group by the stick.

In the present invention, the sausage suspending apparatus may further comprise: adjusting means for adjusting a restarting timing for restarting the movement of the wrapping connector moving body with respect to a restart timing of the supply of the sausage to the conveyor.

According to the above-described configuration, it is possible to vary the number of links of the loop which is suspended beyond the hook absent zone by the last hook of one hook group and the first hook of the ensuing hook group adjacent via the hook absent zone to that last hook. Hence, since the number of links of an end portion (terminal length), which results from the cutting and separation of the loop suspended beyond the hook absent zone, can be changed, the form of end processing can be changed to a form which facilitates the operation (to a position for tucking up the end link onto a loop).

With the above-described apparatus using the adjusting means, the wrapping connector moving body (conveyor) is moved with the sausage supplying device stopped, and both of them are subsequently restarted, the number of sausage links of the loop which is suspended from the last hook of one hook group and the first hook of the ensuing hook group can be changed by simple control.

<Method of Suspending Sausage Loops from Hooks>

The above-described apparatus of the invention is put to practice by the method described below. In that case, the operation of the apparatus of the invention already described is carried out by the method which is described below. In that case, the advantages obtained from the apparatus of the invention are obtained as they are by carrying out the method of the present invention concerning that apparatus.

A method for suspending sausage loops from hooks in accordance with the present invention is carried out by using an apparatus for suspending sausage loops from hooks including a conveyor having a plurality of hooks for suspending a sausage in which a multiplicity of links are connected and an endless wrapping connector moving body on which the plurality of hooks are mounted at a predetermined pitch.

In the present invention, the method for suspending sausage loops from hooks is characterized by comprising the steps of: moving in a downstream direction the wrapping connector moving body on which a plurality of hook groups each formed by a number of hooks corresponding to a maximum number of sausage loops to be suspended from a stick are provided with a respective hook absent zone interposed between adjacent ones of the hook groups; interrupting the supply of the sausage to the conveyor when the sausage which is being supplied to the conveyor is suspended from a last hook of one hook group having a first hook and the last hook; restarting the supply of the sausage to the conveyor when the last hook of the one hook group suspending the sausage therefrom has moved a predetermined distance in a state in which the supply of the sausage to the conveyor is being interrupted; and suspending the sausage from the first hook of an ensuing hook group adjacent via the hook absent zone to the last hook of the one hook group upon restarting of the supply of the sausage.

In the present invention, when the supply of the sausage to the conveyor is completed before the last hook of the one hook group suspends the sausage therefrom, and the number of loop groups suspended from the one hook group at a point of time of that completion is smaller than a minimum number of loops which has been set, the movement of the wrapping connector moving body may be stopped at that point of time, and the supply of the sausage to the conveyor using an ensuing new sausage may be started, whereupon the movement of the wrapping connector moving body may be restarted to cause the ensuing new sausage to follow the loop group and to be suspended from the one hook group. In this way, the "loop group formed by a predetermined number of loops" can be suspended from a hook group.

In addition, a restart timing of the movement of the wrapping connector moving body may be adjusted with respect to a point of time of restarting the supply of the sausage to the conveyor.

The phrase "loop group formed by a predetermined number of loops" referred to in the present invention means a loop group which is formed by loops in any number ranging from a maximum number of loops to a minimum number of loops which is set.

The above-described "maximum number of loops" is the largest number of loops of sausage which can be suspended from a stick of a predetermined length, e.g., a 1.4 m stick, in a state in which a required interval is kept between loops, and this "maximum number of loops" is determined by such as the diameter of the sausage, the structure of stick supporting equipment during sausage heat treatment, and other various conditions. One hook group in the present invention has hooks in a number identical to the maximum number of loops. The greater the maximum number of loops, the greater the amount of sausages which can be heat treated on one stick, so that productivity in the smokehouse can be enhanced.

Meanwhile, the "minimum number of loops" is a minimum number of loops which can be suspended from a stick, and is determined by taking into consideration the productivity of sausage loop formation and the productivity of sausage heat treatment. This "minimum number of loops" can be changed, as required, during production in correspondence with the extent of variation of the length of the natural intestine casings used then (e.g., one sheep casing: 7 to 10 m). This minimum number of loops can be set by inputting the minimum number of loops into the controller provided in the sausage suspending device.

The present invention is not limited to natural intestine cases such as sheep intestine casings and pig intestines, and is applicable to artificial casings such as cellulose casings and collagen casings.

As described above, in the present invention, when the sausage which is being supplied to the conveyor is suspended from all the hooks from a first hook to a last hook of one of the plurality of hook groups provided on the wrapping connector moving body which is being moved, the supply of the sausage to the conveyor is interrupted, and the sausage whose supply has been restarted after the hook absent zone moved a predetermined distance in a state in which the supply of the sausage to the conveyor is being interrupted is suspended from the first hook of the ensuing hook group following the one hook group. Therefore, it is possible to provide an apparatus and a method for suspending sausage loops from hooks, which render the operator's processing operation simple and can shorten the time therefor, thereby making it possible to form a sausage, made by a natural intestine casing nonuniform in length, into loop groups each formed by a predetermined number of loops and to be suspended from the conveyor in a short time, and which are high in productivity.

In addition, according to the present invention, since the operator can easily perform the loop processing operation and, at the same time, loop formation is permitted in a short mechanical idle time, it is possible to provide an apparatus and a method for suspending sausage loops from hooks, which makes it possible to form the sausage, made by a natural intestine casing nonuniform in length, into loop groups each formed by a predetermined number of loops and to be suspended from the conveyor in a short time, and which make it possible to reliably remove the loop groups automatically from the hook groups by a stick, and are labor-saving and high in productivity and reliability.

The above and other objects, features and advantages of the present invention will become more apparent from the following detailed description of the invention when read in conjunction with the accompanying drawings which illustrate the embodiment of the present invention. It is to be understood, however, that the present invention is not limited to this embodiment.

BRIEF DESCRIPTION OF THE DRAWINGS

FIGS. 1A and 1B illustrate an apparatus in accordance with an embodiment of the present invention, in which FIG. 1A is a plane view and FIG. 1B is a front elevational view;

FIGS. 2A and 2B are enlarged views of essential portions of FIGS. 1A and 1B, respectively, and correspond to FIGS. 1A and 1B, respectively;

FIG. 2C is an enlarged view of a loop cutting means shown in FIG. 1A;

FIGS. 4A and 4B are enlarged views of essential portions in the vicinity where the operator is positioned, FIGS. 4A and 4B corresponding to FIGS. 1A and 1B, respectively;

FIGS. 5A and 5B are enlarged views of an essential portion for explaining mainly a hook absent zone in the vicinity of a rear end portion of the stick at a stick discharging position shown in FIG. 3A, in which FIG. 5A is a plane view and FIG. 5B is a front elevational view;

FIGS. 6A and 6B illustrate the apparatus shown in FIG. 1A in a state in which the wrapping connector moving body has moved from the state shown in FIG. 3A, in which FIG. 6A and FIG. 6B are a plan view and a front elevational view, respectively, and illustrate the relationships between a controller and controlled objects;

FIGS. 7A and 7B illustrate the apparatus shown in FIG. 1A in a state in which the wrapping connector moving body has moved from the state shown in FIG. 6A, in which FIG. 7A and FIG. 7B are a plan view and a front elevational view, respectively, and illustrate the relationships between the controller and controlled objects;

FIGS. 8A and 8B illustrate the apparatus shown in FIG. 1A and illustrate a state in which a sausage loop is cut in the state shown in FIG. 7A, in which FIG. 8A is a plane view and FIG. 8B is a front elevational view.

DETAILED DESCRIPTION OF THE PREFERRED EMBODIMENT

A description will be given of the embodiment of the present invention with reference to the accompanying drawings. Prior to that description, referring to FIG. 1A which is a plan view of the apparatus in accordance with the embodiment of the present invention and FIG. 1B which is a front elevational view thereof, a description will be given of the terminology concerning the directionality and the terms associated therewith which are used in the present invention.

Figures 1A, 1B:
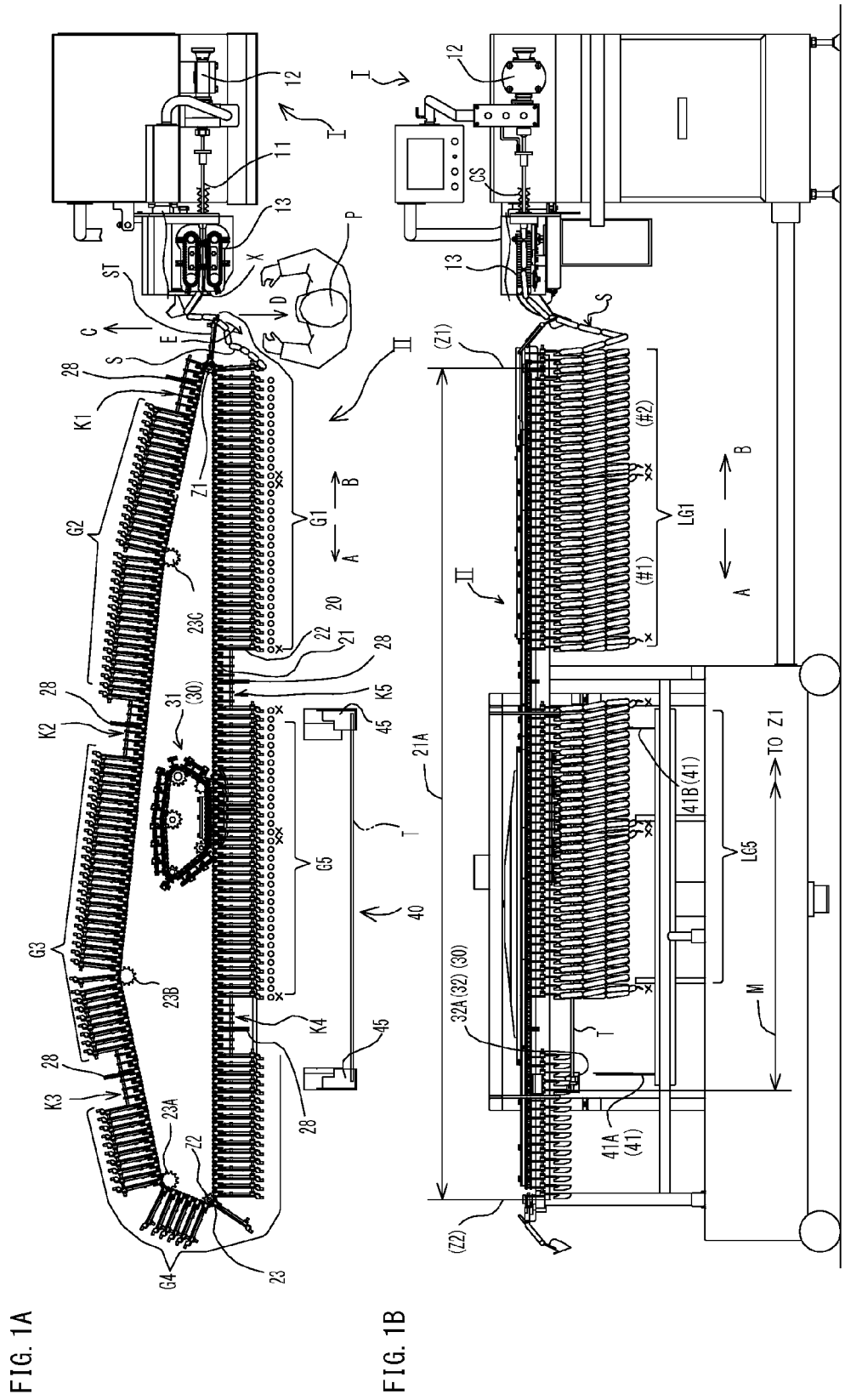

The apparatus of this embodiment is comprised of a sausage supplying device I for stuffing a meat emulsion, i.e., the content of sausage, into a natural intestine casing CS and for twisting the stuffed casing and carrying it out as sausage S in which a multiplicity of links are connected; and a sausage suspending device II in which, upon receiving the supply of the linked sausage S, a plurality of hooks 22 mounted on a wrapping connector moving body 21 formed in the form of a moving chain or belt suspend the linked sausage S therefrom consecutively in loop form. FIG. 1A is a plan view of the apparatus of this embodiment, and FIG. 1B is a front elevational view thereof. FIGS. 2A and 2B illustrate in enlarged form essential portions of FIGS. 1A and 1B, respectively.

In the drawings, the linked sausage S carried out from the sausage supplying device I is supplied from a sausage supplying position X to a conveyor 20 of the sausage suspending device II. An operator P is positioned between the sausage supplying device I and the sausage suspending device II located forwardly in a sausage supplying direction (direction of arrow A) in order to perform the operation. The sausage suspending device II includes the conveyor 20, a stick supporting unit 30, and a stick discharging unit 40. The conveyor 20 has the endless wrapping connector moving body 21 which circulates by linearly moving from around a rotating shaft Z1, which is provided at a right end in the plan view of FIG. 1A, leftwardly with respect to the aforementioned sausage supplying position X on the side where the operator P is positioned, and then by revolving around a left end rotating shaft Z2 to reverse its moving direction, as well as the plurality of hooks 22 mounted on the wrapping connector moving body 21. Herein, the leftward moving direction of the wrapping connector moving body 21 in the direction of arrow A will be referred to as the "downstream direction" or "downstream," and the side in this direction as the "leading side," while the side in the opposite direction thereto, i.e., in the direction of arrow B, will be referred to as the "trailing side," and the side in the direction of arrow C in the orthogonal direction to the left-right direction and away from the operator P will be referred to the "rearward side," while the side in the opposite direction thereto, i.e., in the direction of arrow D, and close to the operator P as the "frontward side."

The apparatus of this embodiment shown in FIGS. 1A and 1B includes the sausage supplying device I and the sausage suspending device II. FIG. 1A is a plan view, FIG. 1B is a front elevational view, and FIGS. 2A and 2B are enlarged views of their essential portions, respectively. The operator P is positioned between the sausage supplying device I and the sausage suspending device II in front of the apparatus on the frontward side which is the near side with respect to the sausage supplying position X.

The sausage supplying device I is adapted to stuff the sausage material (meat emulsion) fed out by a pump 12 (see FIGS. 1A and 1B) into the natural intestine casing CS loaded on a nozzle 11 (see FIGS. 1A and 1B) to form a straight pipe-like stuffed casing, which is then carried out toward the sausage suspending device II by a circulating pair of linking chains 13, so as to supply the stuffed casing to the conveyor 20 from the sausage supplying position X (see FIG. 2A) on an extension line of a carrying-out path 13-1 of the linking chains 13. The linking chains 13 have pinchers 13A (see FIGS. 2A and 2B) provided at fixed intervals in their traveling direction (direction of arrow A), and the aforementioned straight tubular stuffed casing is pinched by bottom portions of V-shaped grooves of the pinchers 13A in cooperation with each other to thereby form constrictions. In addition, the above-described sausage supplying device I has a mechanism for imparting rotation to the stuffed casing at an outlet portion of the nozzle 11, and is thereby adapted to impart a twist to the stuffed casing with respect to its portion pinched by the pinchers 13A. Thus, the sausage S processed into chain form by being constricted and twisted on the leading side in the carrying-out direction (direction of arrow A) relative to the pinchers 13A is sent out toward the conveyor 20 via a guide 14 provided at an outlet of the linking chains 13 and having an inclined surface.

The aforementioned sausage supplying position X, which is a position for supplying the sausage S to the conveyor 20, is a place where the sausage S on the sausage carrying-out path 13-1 is carried out from the sausage supplying device I, and in the apparatus of this embodiment it is a position where the conveyance of the sausage S by the linking chains 13 is finished. The sausage S is supplied from the sausage supplying position X to the conveyor 20, and in the apparatus of this embodiment the sausage S which is supplied from the sausage supplying position X to the conveyor 20 is adapted to move from the sausage supplying position X toward the conveyor 20 via the guide 14.

In this apparatus, each of the aforementioned linking chains 13 has a chain; however, instead of this linking chain 13, it is also possible to use a linking belt 13 using a belt.

As shown in FIGS. 2A and 2B, the sausage suspending device II is provided with the conveyor 20 which has the hooks 22 for suspending therefrom the sausage S in which a multiplicity of links L are connected and the endless wrapping connector moving body 21 on which the plurality of hooks 22 are attached at a predetermined pitch FP. The sausage suspending device II has the rotating shafts Z1 and Z2 having respective vertical axes at two positions spaced apart in the direction in which the sausage is supplied from the above-described sausage supplying device I (direction of arrow A), and the endless wrapping connector moving body 21, which is constituted by a chain or a belt and moves by being driven by a pair of driving wheel bodies 23 provided on the rotating shafts Z1 and Z2, respectively, is wound around and trained between the both driving wheel bodies 23. In this example, the wrapping connector moving body 21 is constituted by a chain, and the driving wheel bodies are constituted by sprockets. This wrapping connector moving body 21 has between these two rotating shafts Z1 and Z2 a linearly moving zone 21A for moving from the rotating shaft Z1 toward the rotating shaft Z2 on the frontward side, i.e., the near side for the operator P, in the downstream direction A, i.e., the direction in which the sausage is supplied from the sausage supplying device I, as well as a return path moving zone for moving from the rotating shaft Z2 to the rotating shaft Z1 on the rearward side C. A revolvingly moving zone 21B for changing the direction of the wrapping connector moving body 21 is formed around each of the rotating shafts Z1 and Z2. Namely, the linearly moving zone 21A and the return path moving zone are connected by the revolvingly moving zones 21B at both ends to form a circulating path. The linearly moving zone 21A extends in such a manner as to form a straight line between the rotating shafts Z1 and Z2, and the return path moving zone has a bulged path so as to move away from the aforementioned linearly moving zone 21A by means of three guide sprockets 23A, 23B, and 23C, as shown in FIG. 1A.

Further, as shown in FIGS. 2A, 2B, 6A, and 6B, the sausage suspending device II has an origin position OR, a carrying-out stop commanding position ST, a last hook position detecting means 26, and a first hook position detecting means 27. The origin point OR is the starting position of hook groups G1 to G5 and is the position where a first hook 22F of each of the hook groups G1 to G5 starts movement to suspend the sausage S supplied from the sausage supplying position X. The carrying-out stop commanding position ST is provided at a position spaced apart a predetermined angle α, i.e., 80 degrees in this embodiment, from the origin position OR. The last hook position detecting means 26 is a means which detects the arrival of a last hook 22L at the carrying-out stop commanding position ST and issues a signal for stopping the operation of the sausage supplying device I. As this detecting means 26, it is possible to use a known encoder (not shown) which issues the amount of rotation of the motor shaft of a conveyor motor Mo3 for moving the last hook 22L, and a known proximity sensor which detects the last hook 22L itself or a dog for being detected (not shown) which is mounted on the rotating shaft Z1. The first hook position detecting means 27 is a means which detects the arrival of the first hook 22F at the origin point OR and issues a signal for stopping the operation of the conveyor 20. This detecting means 27 has a known proximity sensor for detecting the first hook 22F itself.

As described above, the wrapping connector moving body 21 of the sausage suspending device II has, as shown in FIG. 2A, the revolvingly moving zone 21B for revolvingly moving in a horizontal plane from the rearward side C to the frontward side D about the rotating shaft Z1 disposed downstream A of the sausage supplying position X in the direction in which the sausage S is supplied to the conveyor 20 (direction of arrow A), as well as the linearly moving zone 21A for moving in the downstream direction A from that revolvingly moving zone 21B. Each hook 22 mounted on the wrapping connector moving body 21 revolvingly moves about the rotating shaft Z1 in the direction of arrow E from the rearward side C to the frontward side D in the horizontal plane (plane parallel to the plane of the drawing in FIG. 2A) so as to pass the sausage supplying position X, to thereby suspend the sausage S therefrom.

The wrapping connector moving body 21 revolvingly moves about the rotating shaft Z1 intermittently by 80 degrees each, and each hook 22 of the hook group G continues intermittent movement while interrupting the revolving movement for a predetermined time duration at the carrying-out stop commanding position ST, and one loop (referred to as the "predetermined loop") SL having a predetermined number of, i.e., in this embodiment six, links L is suspended from and between adjacent two hooks 22. The number of links of this predetermined loop SL can be altered to a desired number of links, e.g., seven, by changing the moving speed of the hooks 22. The construction provided is such that each of these hooks 22 is not detected by the last hook position detecting means 26 even if it reaches the carrying-out stop commanding position ST. It should be noted that the revolving movement of the wrapping connector moving body 21 may be continuous movement which is not interrupted for a predetermined time duration at the carrying-out stop commanding position ST.

Further, the sausage suspending device II includes a stick discharging member 41 of the stick discharging unit 40 whereby a stick T (see FIGS. 1A and 1B) disposed along the linearly moving zone 21A by a pair of stick supporting members 32 located within a predetermined range M allowing the hook groups G1 and G5 to be arranged on the downstream side A from the rotating shaft Z1 is lifted as the stick discharging member 41 moves along a stick discharging path 42 intersecting the linearly moving zone 21A, so as to discharge the stick T from the conveyor 20; as well as a stick discharge detecting means 44 for detecting the completion of stick discharging from the conveyor 20 by the stick discharging member 41 (see FIGS. 6A and 6B).

Figure 7A:
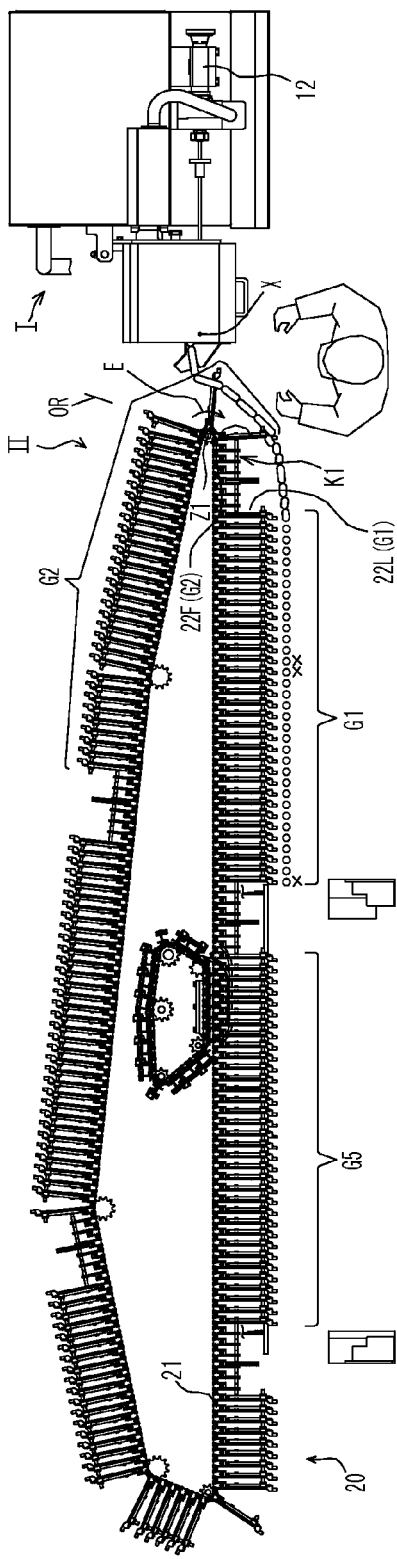
Figure 7B:
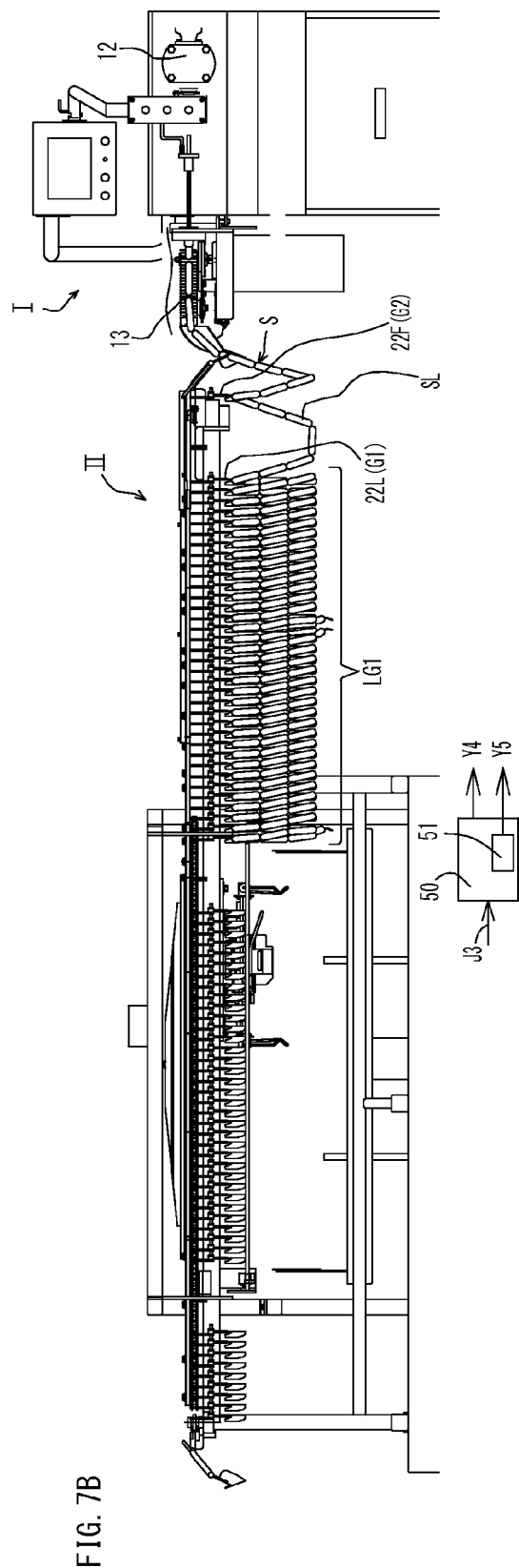

Furthermore, in the sausage suspending device II, when a hook absent zone K5 adjacent to a preceding hook group G5 preceding one hook group G1 is located over the stick discharging path 42, the first hook 22F of an ensuing hook group G2 adjacent to and following the one hook group G1 is arranged to be located on the rearward side C in a state of opposing the sausage supplying position X with an opposing distance W therebetween (see FIG. 4A), and the first hook 22F of the ensuing hook group G2 which passed the sausage supplying position X by revolvingly moving in the direction of arrow E is arranged to suspend the sausage S supplied to the conveyor 20 from the sausage supplying device I which resumed operation on the basis of a stick discharging detection signal J3 from the stick discharge detecting means 44 shown in FIG. 6B (see FIGS. 7A and 7B).

Each hook 22 mounted on the above-described wrapping connector moving body 21 has a hooked shape in which it is suspended in a downward direction and then extends to the outer side with respect to the circulating area of the wrapping connector moving body 21 (area surrounded by the circulating path of the circulating wrapping connector moving body), i.e., to the frontward side in the linearly moving zone 21A, and its lower end side is bent upwardly. These multiplicities of hooks 22 are mounted on the wrapping connector moving body 21 so as to form a plurality of hook groups G with each of hook absent zones K (K1 to K5) interposed between adjacent ones of the hook groups G, the hook absent zone being a zone where the hooks 22 are not mounted. In the example of FIG. 1A, five hook groups G1 to G5 are provided, and 34 hooks 22 are provided in one hook group G at the predetermined mounting pitch FP. This one hook group G is formed by 34 hooks 22 in a number identical to the maximum number of the sausage loops SL to be suspended from the stick T, i.e., 34 loops.

Figures 5A, 5B:
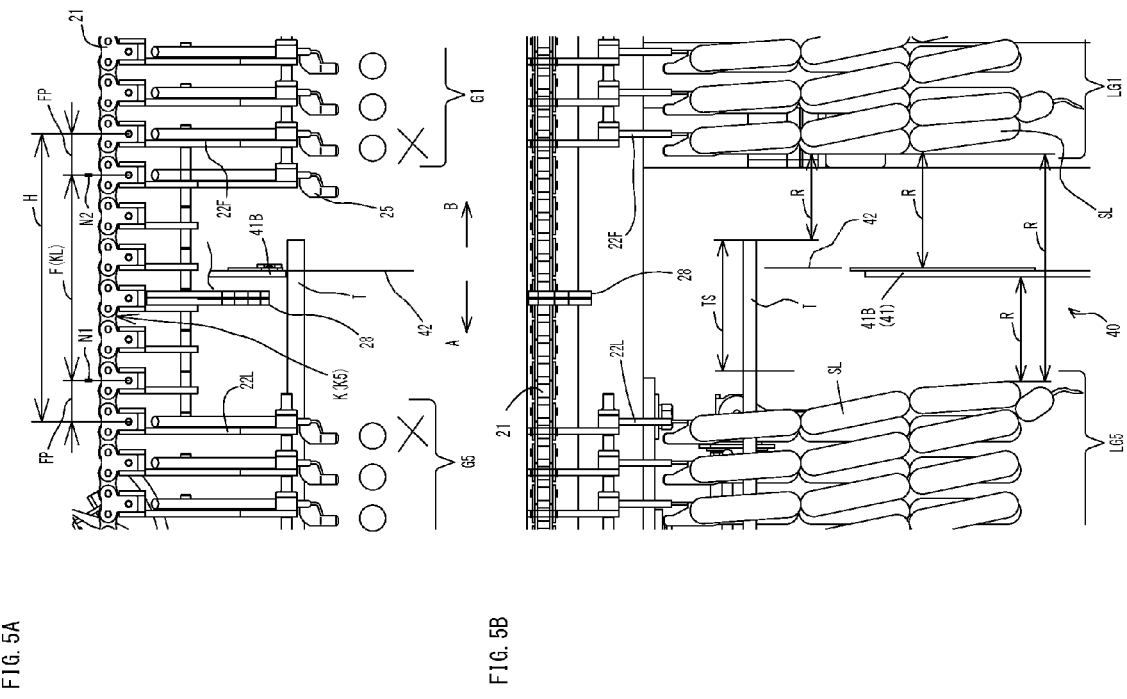

As shown in FIG. 5A, the hook absent zone K formed in the wrapping connector moving body 21 is a section F between, on the one hand, a position N1 spaced apart one pitch FP toward the trailing side (in the direction of arrow B) from the last hook 22L of one hook group G (G5) and, on the other hand, a position N2 spaced apart the one pitch FP toward the leading side (in the direction of arrow A) from the first hook 22F of an ensuing hook group G (G1) adjacent to and following the one hook group G (G5). The hooks 22 are not mounted on this hook absent zone K. It should be noted that the aforementioned "one pitch FP" refers to a distance equal to the mounting pitch FP of the hooks 22 mounted on the wrapping connector moving body 21. The hooks 22 which are thus mounted on the wrapping connector moving body 21 at the predetermined pitch FP are not mounted in the hook absent zone K, and these hooks which are not mounted will be referred to herein as the "null hooks." It should be noted that there are six null hooks 25 (indicated by two-dotted dash lines) in the hook absent zone K in this embodiment.

Figure 3A:
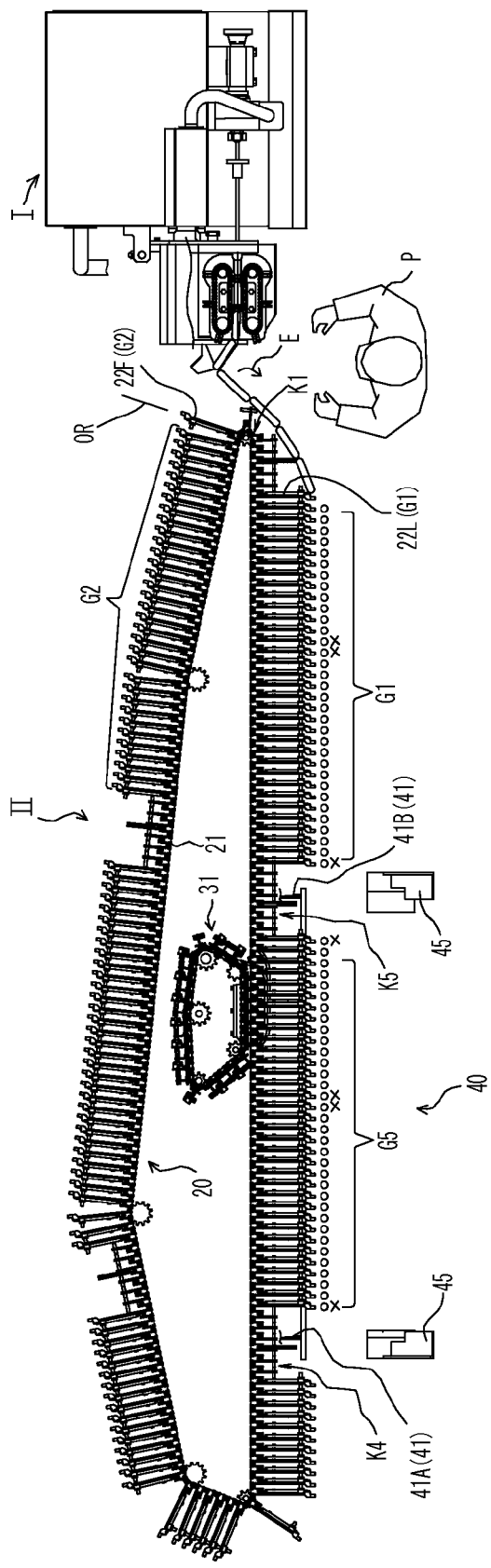
FIG. 3A is a plan view of the apparatus shown in FIG. 1A and illustrates a state in which a wrapping connector moving body has moved from the state shown in FIG. 1A.
Figure 3B:
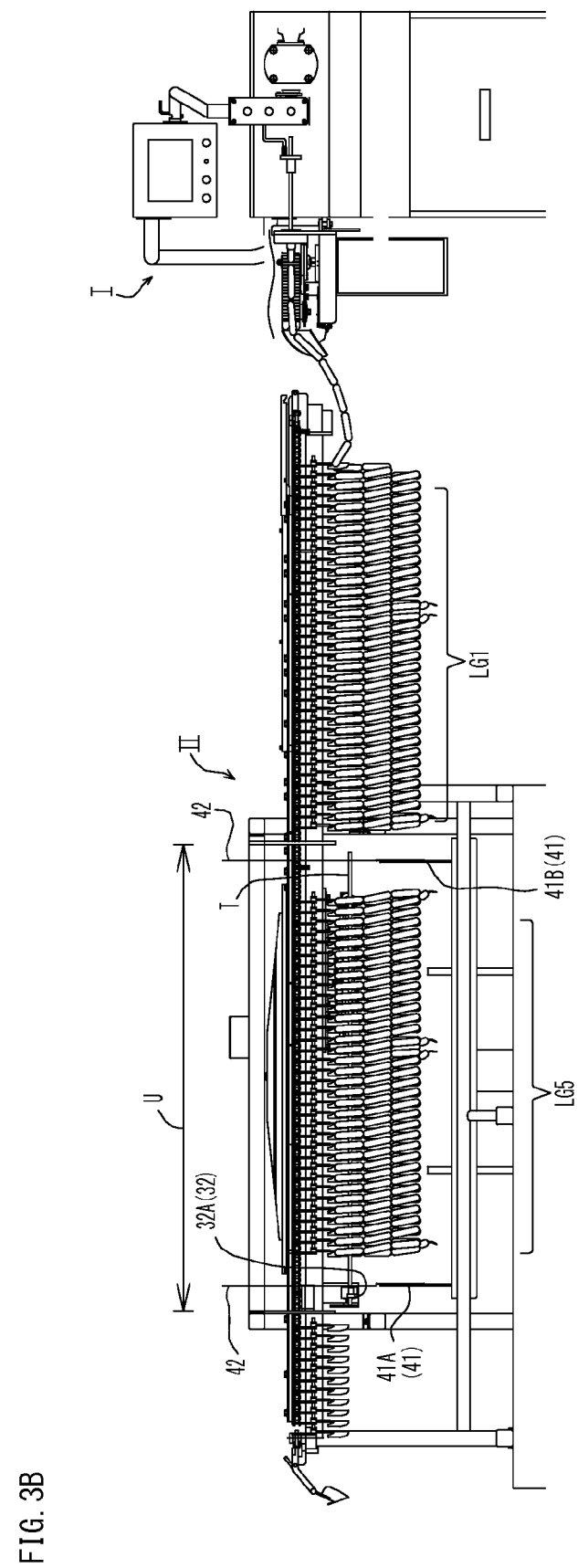
FIG. 3B is a front elevational view of the apparatus shown in FIG. 1A and illustrates the state in which the wrapping connector moving body has moved from the state shown in FIG. 1A.
Figure 3C:
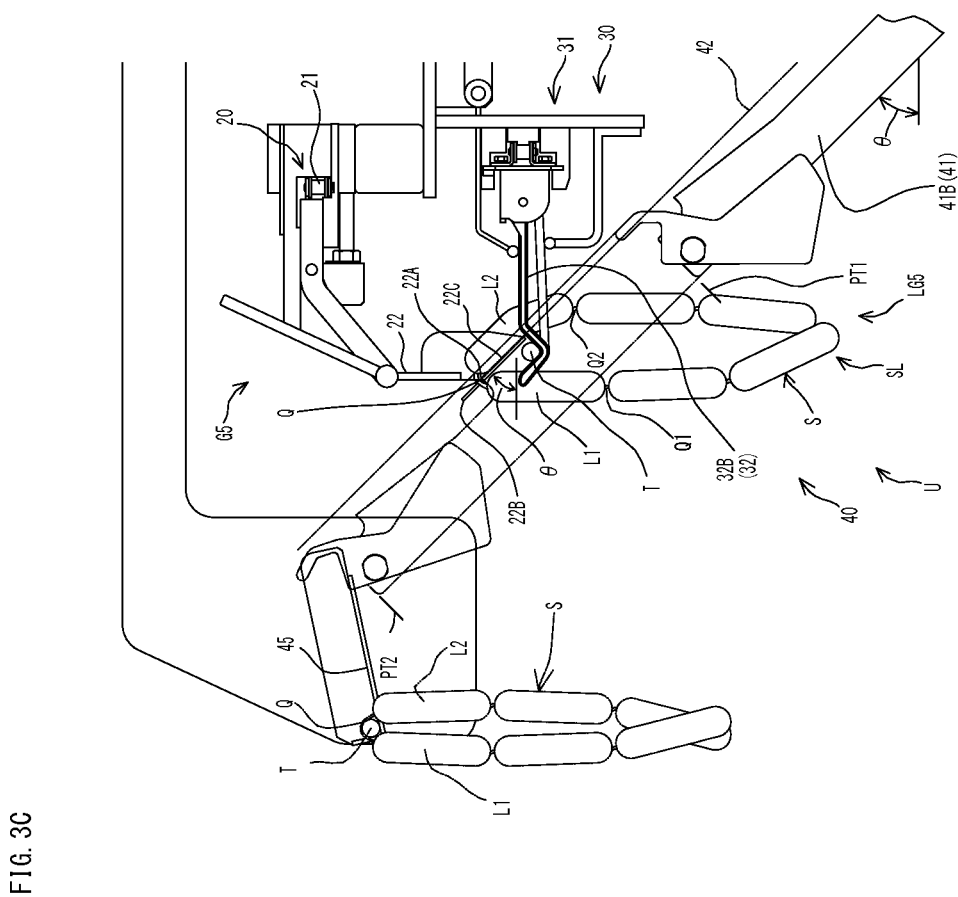
FIG. 3C is an enlarged side elevational view illustrating positional relationships of respective members during the discharging of a stick the state in which the wrapping connector moving body has moved from the state shown in FIG. 1A.

As shown in FIG. 3C, the aforementioned hook 22 has a trough portion 22A for retaining a highermost twisted portion Q for connecting a preceding link L1 and an ensuing link L2 for forming the sausage loop SL, a projecting portion 22B which projects from the trough portion 22A in such a manner as to be inclined upwardly with an angle θ with respect to the horizontal plane, and an inclined portion 22C which is inclined downwardly from the trough portion 22A with the angle θ. The hook 22 suspends the loop SL such that as the ensuing link L2 is placed on the inclined portion 22C, the interval between the preceding link L1 and the ensuing link L2 is enlarged in order to obtain such a shape that allows the stick T supported by the stick supporting unit 30 to be easily passed through the loop SL when the loop SL has moved in the downstream direction A.

Reference numeral 28 denotes a loop cutting means provided on the wrapping connector moving body 21. Referring to FIG. 2C illustrating the loop cutting means 28 viewed from the sausage supplying position X side as well as FIGS. 8A and 8B, the loop cutting means 28 has a loop cutter including a holder 28A attached to the wrapping connector moving body 21 and a blade 28B tucked inside the holder 28A. The operator removes a below-described terminal loop SL from the last hook 22L (G1) and the first hook 22F (g2), pushes an intermediate portion V of the loop into a V-groove 28A1 of the holder 28A, and cuts the link L or a connecting portion (twisted portion) between the links. Since the loop cutter is provided in the hook absent zone K, the operation by the operator P is facilitated.

The stick supporting unit 30 is located in the range of the linearly moving zone 21A of the wrapping connector moving body 21 and is provided with the pair of stick supporting members 32. The stick supporting members 32 support the stick T from below at a fixed position in the back-and-forth direction (C-D direction in FIG. 1A), and include a stick front portion supporting member 32A (see FIG. 1B) for supporting the front portion of the stick T and a stick rear portion supporting member 32B (see FIG. 3C) for supporting the rear portion of the stick T. The stick front portion supporting member 32A which supports a front portion in the vicinity of a front end of the stick T from below at an immobile position and is capable of abutting against the front end of the stick T to prevent the movement of the stick in the downstream direction A. The stick front portion supporting member 32A and the stick rear portion supporting member 32B are adapted to respectively support the front portion of the stick T and the rear portion of the stick T so that the stick T is disposed at a position between the preceding link L1 and the ensuing link L2 which are suspended from the hook 22 with the interval therebetween enlarged and at a position above a twisted portion Q1 of the preceding link L1 and a twisted portion Q2 of the ensuing link L2.

Concerning the support of the rear portion of the stick in this embodiment, an endless stick rear portion supporting moving body 31 (see FIG. 1A) is disposed in an internal area of the circulating zone of the wrapping connector moving body 21, and the stick rear portion supporting member 32B is mounted on this stick rear portion supporting moving body 31. The stick rear portion supporting moving body 31 is positioned within the circulating zone of the wrapping connector moving body 21 at a position close to a rear end between the front end and the rear end of the stick T in the A-B direction in which the linearly moving zone 21A extends, and the stick rear portion supporting member 32B having a hooked shape is rotatably supported by the stick rear portion supporting moving body 31 formed by a chain constituting a small circulating body. As can be seen from FIG. 1A as well, with respect to the linearly moving zone 21A of the wrapping connector moving body 21, the stick rear portion supporting moving body 31 is adapted to be brought into close proximity with the same, then move in parallel therewith, and subsequently move away therefrom. In a range from the time the stick rear portion supporting member 32B is brought into close proximity with the linearly moving zone 21A until the stick rear portion supporting member 32B moves away therefrom, the stick rear portion supporting member 32B, which is rotatably mounted on the stick rear portion supporting moving body 31, is rotated upwardly by a bar-like cam member (not shown), and is thereby brought to the same height as the stick front portion supporting member 32A in the heightwise direction and in the back-and-forth direction (D-C direction in FIG. 1A), thereby supporting the rear portion of the stick T. In order to support the rear portion of the stick T between the hook 22 suspending the sausage loop and the ensuing hook 22, the position of the stick rear portion supporting member 32B is positionally offset from these hooks 22, and the stick rear portion supporting member 32B rotates upwardly at that position, and when the ensuing stick rear portion supporting member 32B has supported the stick rear portion, the preceding stick rear portion supporting member 32B rotates downwardly and moves away. Thus, the stick rear portion supporting member 32B supports the stick rear portion by being located between opposing portions of the sausage loop SL which moves downstream, and supports the stick T together with the stick front portion supporting member 32A in a state in which the loops SL are consecutively sent over the stick at the fixed position.

The stick discharging unit 40 is disposed at a stick discharging position U at a lateral position of the linearly moving zone 21A of the wrapping connector moving body 21. The stick discharging unit 40 is adapted to raise the stick T inserted in the loop group LG5 suspended from the hook group G5 which reached the stick discharging position U after moving to the downstream side, and is adapted to remove and discharge the loop group LG5 from the hook group G5 by the raised stick T. The hook absent zone K5 adjacent to the aforementioned hook group G5 which has reached the stick discharging position U is positioned over the stick discharging path 42 where the arm-like stick discharging member 41 of the stick discharging unit 40 is raised and lowered (see FIGS. 3A and 3B).

As shown in FIGS. 3A and 3B, the stick discharging unit 40 includes the stick discharging member 41 consisting of a front stick discharging member 41A for lifting the stick T at its front portion and a rear stick discharging member 41B for lifting the stick T at its rear portion, these front and rear stick discharging members 41A and 41B forming a pair in the longitudinal direction of the stick T; and a receiving stand 45 for receiving the stick T discharged from the conveyor 20 by the stick discharging member 41. The stick discharging member 41 is disposed at a standby position PT1 below the stick supporting unit 30 in a state in which stick discharging member 41 is inclined upwardly at the same angle as the angle θ at the projecting portion 22B of the hook 22. The arrangement provided is such that the stick discharging member 41 is raised at the angle θ, discharges the stick T from the conveyor 20, is lowered after discharging, and returns to the standby position PT1 to wait for the arrival of the ensuing loop group LG1. Although the stick discharging member 41 passes a position higher than the trough portion 22A of the hook 22, the stick discharging member 41 moves through the space between the last hook 22L and the first hook 22F with the hook absent zone K interposed therebetween, so that the stick discharging member 41 lifts up the stick T, which is disposed in close proximity to the hooks 22 from the stick supporting unit 30, without colliding against the hooks 22 (see FIG. 3C).

The stick T which is raised at the angle θ by the stick discharging member 41 moves in parallel with, and by moving in close proximity to, the lower surfaces of the inclined portion 22C and the projecting portion 22B of the hook 22, abuts against a vicinity of an upper end portion of the preceding link L1, removes the highermost twisted portion Q from the projecting portion 22B, and suspends the loop SL therefrom. The stick T with the loop SL suspended therefrom is delivered from the stick discharging member 41 onto the receiving stand 45 at a raised end position PT2 of the stick discharging member (see FIG. 3C). Thus, the stick discharging unit 40 discharges the stick T from the conveyor 20.

Since the sausage suspending device II is so arranged as to suspend the loop SL from the stick T as the highermost twisted portion Q retained at the trough portion 22A of the hook 22 is received by the stick T, even when the production item is changed to a sausage S having a different length of the link L, it is unnecessary to change the positions of the stick supporting unit 30 and the stick discharging unit 40, so that the apparatus becomes highly versatile.

With this apparatus, since the discharge of the stick T from the conveyor 20 is performed when the hook absent zone K is located over the stick discharging path 42 (see FIG. 5A), a sufficiently large range or size can be obtained for an allowable moving range R of the sausage loop SL suspended from the hook 22 and a portion TS of the stick T supported by the stick discharging member 41, whereby only the loop group LG at the stick discharging position U can be removed from the hook group G. With this apparatus, since the allowable moving range R is provided, even if the loop SL of the sausage S suspended from the hook 22 has swingingly moved or the suspending position concerning the moving direction A of the hook 22 has deviated, that loop SL is prevented from coming into contact with the stick discharging member 41 or the adjacent loop group LG (see FIG. 5B).

Next, a description will be given of a controller 50. The controller 50 provides control so as to stop, and resume the operation of, the movement of the wrapping connector moving body 21, the operation of the pump 12 of the sausage supplying device I, the carrying-out supply of the sausage S, i.e., the movement of the carrying chains 13, and the operation of the stick discharging unit 40 in relation to each other. On the basis of detection signals J to the controller 50 from the last hook position detecting means 26, the first hook position detecting means 27, and the stick discharge detecting means 44, the controller 50 issues command signals Y to a pump motor Mo1 and a linking chain motor Mot of the sausage supplying device I, the conveyor motor Mo3 of the conveyor 20, and a stick discharge cylinder 43 of the stick discharging unit 40, to thereby control the operation of the sausage supplying device I and the sausage suspending device II (see FIGS. 6A and 6B).

An adjusting means 51 of the controller 50 adjusts the timing for resuming the movement of the wrapping connector moving body 21 with respect to the timing of resumption of the sausage supply to the conveyor 20, and thereby sets to a desired number the number of links L of the loop (referred to as the terminal loop) SL which is suspended from the last hook 22L (G1) of the hook group G1 and the first hook 22F (G2) of the ensuing hook group G2. The change of the starting timing of the conveyor motor Mo3 for driving the wrapping connector moving body 21 is effected by the adjustment of the output timing of a hook movement command signal Y5 shown in the block diagram portions of FIGS. 6B and 7B.

In the apparatus of this embodiment, when the last hook 22L (G1) of the hook group G1 reaches the carrying-out stop commanding position ST after passing the sausage supplying position X, the supply of the sausage to the conveyor 20 is interrupted, the stopping of this supply allows six links L in a number identical that of the links L for forming the predetermined loop SL to be formed between the last hook 22L (G1) and the linking chains 13 which stopped the operation (see FIG. 2A). The aforementioned adjusting means 51 changes the timing of supplying the six links L formed as described above to the hook 22 to thereby adjust the mutual restart timings of the linking chains 13 (sausage supplying device I) and the wrapping connector moving body 21 (conveyor 20) so as to suspend the terminal loop SL having a desired number of links between the last hook 22L (G1) and the first hook 22F (G2).

According to such adjustment that the restarting of the linking chains 13 and the wrapping connector moving body 21 is at the same timing, a terminal loop having six links identical to the number of links of the predetermined loop SL is suspended. According to such adjustment that the restart timing of the wrapping connector moving body 21 is delayed relative to the restarting of the linking chains 13, a terminal loop having a number of links greater in number than the number of links of the predetermined loop SL, e.g., seven links, is suspended. According to such adjustment that the restart timing of the wrapping connector moving body 21 is speeded up relative to the restarting of the linking chains 13, a terminal loop having a number of links smaller in number than the number of links of the predetermined loop SL, e.g., five links, is suspended (see FIGS. 7A and 7B). Thus, the number of links of the terminal loop SL can be altered by the adjusting means 51.

Figure 9:
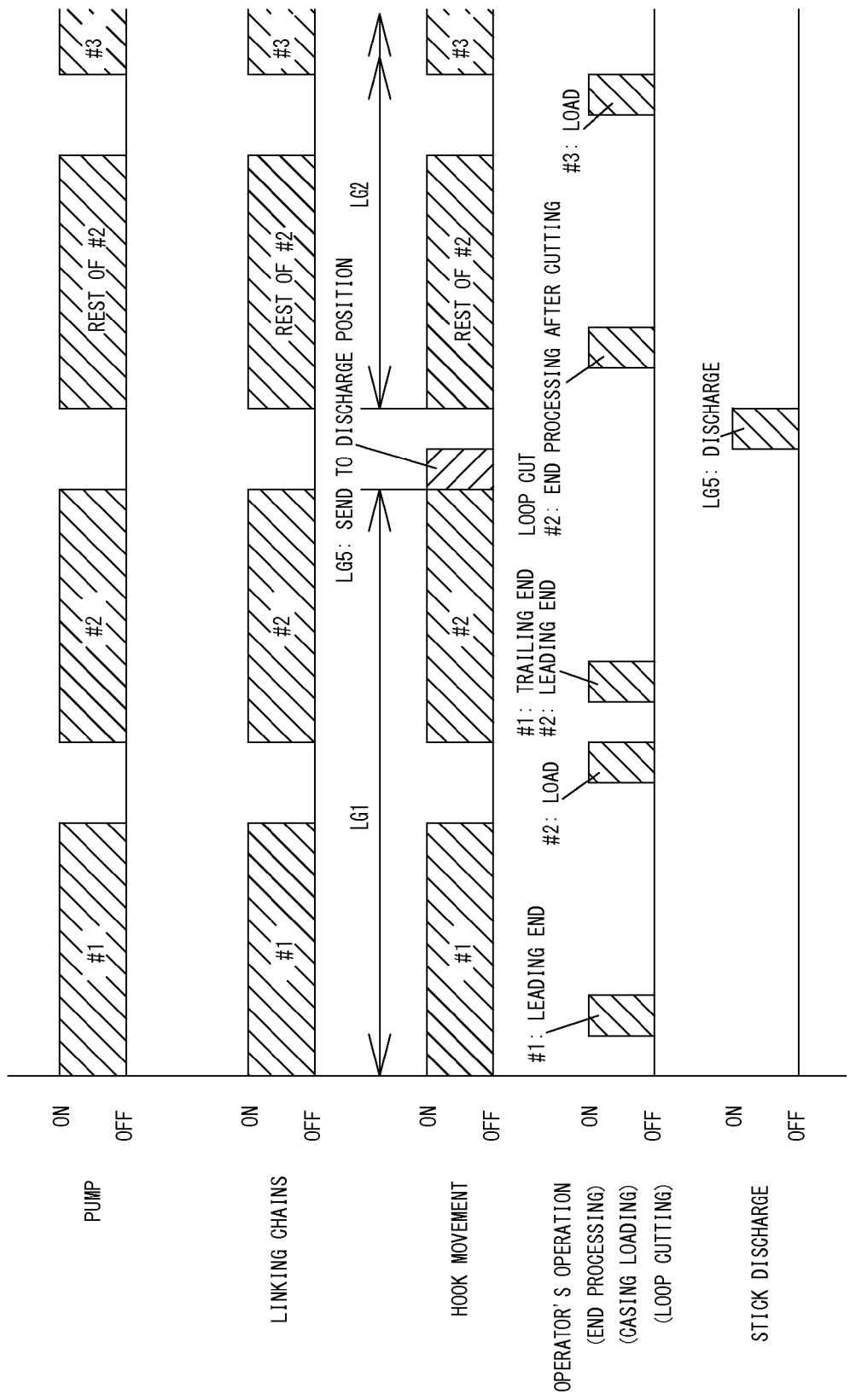
FIG. 9 is a timing chart illustrating the operation of the apparatus shown in FIG. 1A.

In the apparatus of this embodiment thus configured, the sausage is suspended in loop form in the following procedure. A description will be given of this operation with reference to FIGS. 1A to 8B and FIG. 9 which shows a timing chart. The timing chart of FIG. 9 shows the timing of operation of the pump 12 and the linking chains 13 of the sausage supplying device I, the movement of the hooks 22 of the sausage suspending device II, the operation by the operator P, and the discharging of the stick T. The operation in accordance with this timing chart is carried out on the basis of the controller 50.

(1) The conveyor 20 is set up on the downstream side (in the direction of arrow A) (see FIGS. 1A and 1B).

(2) The sausage S carried out from the sausage supplying device I is formed into one loop consisting of six links, and when the last hook 22L (G1) of the hook group G1 with such a predetermined loop SL suspended therefrom reaches the carrying-out stop commanding position ST, the sausage supplying device I is stopped in response to a supply stop command signal Y1 to the pump motor Mo1 and the linking chain motor Mot on the basis of a detection signal J1 from the last hook position detecting means 26, to thereby stop the supply of the sausage S to the conveyor 20 (see FIGS. 1A, 1B, 2A, 2B, 6A, and 6B).

(3) In the state in which the supply of the sausage S to the conveyor 20 is stopped, the last hook 22L (G1) of the hook group G1 passes the carrying-out stop commanding position ST and continues movement, with the result that the sausage S suspended from and between the last hook 22L (G1) and the stopped linking chains 13 is pulled in the downstream direction A, and its suspended length becomes short.

(4) The aforementioned last hook 22L (G1) which passed the carrying-out stop commanding position ST moves a predetermined distance equal to a length KL (see FIG. 5A) of the hook absent zone, the hook absent zone K1 moves in the direction of arrow E, and the first hook 22F (G2) of the ensuing hook group G2 reaches the origin position OR shown in FIGS. 3A and 4A, whereupon the wrapping connector moving body 21 stops movement in response to a conveyor stop command signal Y2 to the conveyor motor Mo3 on the basis of a first hook position detection signal J2 from the first hook position detecting means 27, as shown in the block diagram portions of FIGS. 6A and 6B, so that the first hook 22F (G2) stops at the origin position OR (see FIGS. 3A and 3B).

(5) The hook group G5, from which the loop group LG5 consisting of 34 loops, i.e., the largest number of loops, with its both ends processed is suspended, is moved to the stick discharging position U by the movement of the wrapping connector moving body 21 by the aforementioned predetermined distance in the step (4) described above (see "SEND TO DISCHARGE POSITION" in FIG. 9), and stops at that position U (see FIGS. 3A and 3B). The stick discharge cylinder 43 is raised in response to a stick discharge command signal Y3 based on the aforementioned detection signal J2, and the stick T inserted in the loop group LG5 is discharged by the raising of the stick discharging member 41 to transfer the loop group LG5 onto the stick T (see FIGS. 6A and 6B).

(6) When the discharging of the stick T is completed, the pump motor Mo1 and the linking chain motor Mot are started in response to a supply command signal Y4 based on the stick discharging detection signal J3 from the stick discharge detecting means 44 (see the block diagram portions of FIGS. 6A and 6B), so that the sausage supplying device I resumes operation, and the sausage S is supplied from the sausage supplying position X to the conveyor 20.

(7) The conveyor 20 resumes operation in response to a hook movement command signal Y5 from the adjusting means 51 on the basis of the stick discharging detection signal J3. The first hook 22F (G2) of the ensuing hook group G2 which was at a standstill at the origin position OR moves about the rotating shaft Z1 and suspends therefrom the sausage S from the sausage supplying position X. Thus, the terminal loop SL having seven links as a desired number of links L is suspended from and between the last hook 22L (G1) and the first hook 22F (G2) in such a manner as to extend across and beyond the hook absent zone K1 (see FIGS. 7A and 7B).

(8) With respect to the loop group LG1 which is moving to the stick discharging position U, the operator P cuts a lengthwise intermediate portion V (position of three-and-a-half link length) of the terminal loop SL, which is suspended in such a manner as to extend across and beyond the hook absent zone K1, manually or by using the loop cutting means 28 to separate the terminal loop SL (see FIGS. 8A and 8B).

(9) An end SE1 of the sausage suspended from the last hook 22L (G1) after being separated is tied to a predetermined loop SL of the hook group G1, and an end SE2 of the sausage suspended from the first hook 22F (G2) is similarly tied to a predetermined loop SL of the ensuing hook group G2. This operation is the end processing (see FIGS. 8A and 8B). It should be noted that the "X" mark in FIGS. 1A to 8B denotes a portion which has been subjected to the end processing of the sausage S.

(10) After completion of the sausage supply to the hook group (G2), when the hook group G1, from which the loop group LG1 with its both ends processed is suspended, reaches the stick discharging position U, the first hook (see FIGS. 1A and 1B) of the hook group G3 reaches the origin position OR. Then, the operation in the above-described steps (4) and (5) is performed to transfer the loop group LG1 onto the stick T.

(11) It should be noted that, instead of cutting and separating the terminal loop SL suspended from and between the last hook 22L (G1) of the hook group G1 and the first hook 22F (G2) of the ensuing hook group G2, at the stage before the resumption of the operation of the sausage supplying device I, the sausage S suspended from and between the last hook 22L (G1) of the hook group G1 and the stopped sausage supplying device I and having a short length may be cut and separated at the position V of three-and-a-half link length from the last hook 22L (G1) of the hook group G1. Since the hook absent zone K1 is present, even if the suspended length of the sausage S is short, the cutting and separating operation of the sausage S by operator P1 can be executed without being hampered by the hooks (see FIG. 4B).

It should be noted that the numbers #1, #2, and #3 listed in the timing chart of FIG. 9 are the numbers of the respective natural intestine casings CS which are sequentially loaded on the nozzle 11 by the operator P, and are also the numbers of the sausage S made by the natural intestine casings as well as their loops SL. The loops of #1 sausage S and the loops of #2 sausage S, which is cut and separated by the operator P, are suspended from the hook group G1 shown in FIGS. 1A and 1B. The rest of #2 sausage S which has been cut and separated and #3 sausage S which is made by an ensuing new #3 natural intestine casing are suspended from the hook group G2.

In the above, a description has been given of the case where, during the stuffing of one natural intestine casing CS, the sausage S made by the stuffed casing during the stuffing is suspended from the last hook 22L of the hook group G. Next, a description will be given of the case where before the last hook 22L of one hook group G suspends the sausage S, the stuffing into one natural intestine casing Cs is finished.

As already described, one hook group G is formed by 34 hooks 22 corresponding to 34 loops, i.e., a predetermined maximum number of loops, and the hook absent zone K having six null hooks 25 is provided between this hook group and the ensuing hook group G. When the sausage S made by completion of stuffing into the natural intestine casing CS is suspended from the first hook 22F to one of the 26th to 34th hooks 22 of this one hook group G as the loop group LG, namely, when the loop group LG constituted by loops ranging from 26 loops (minimum number of loops) suspended from 26 hooks 22 to 34 loops (maximum number of loops) suspended from 34 hooks 22 is formed as one hook group G, after completion of stuffing into the natural intestine casing CS, the one hook group G, from which the loop group LG constituted by loops ranging from the minimum number of loops to the maximum number of loops is suspended, undergoes movement toward the stick discharging position U without suspending an ensuing new sausage S using an ensuing new natural intestine casing.

In a case where the length of one natural intestine casing CS is short, and the stuffing of one natural intestine casing SC has been finished by the formation of the loop group LG of less than 26 loops (minimum number of loops) with respect to one hook group G, a new sausage S constituted by using an ensuing new natural intestine casing CS is suspended from the remaining hooks 22 of the one hook group G, and until the number of loops combining the loops SL formed by the new sausage S reaches 26 loops (minimum number of loops), the sausage S using still another new natural intestine casing CS is suspended from the remaining hooks 22.

When, during the stuffing into the aforementioned new natural intestine casing CS, the sausage S constituted by using that natural intestine casing is suspended from the last hook 22L of one hook group G and the last hook 22L reaches the carrying-out stop commanding position ST, the carrying out of the sausage from the sausage supplying device I is stopped, and the supply of sausage to the conveyor 20 by the sausage suspending device II is interrupted. Subsequently, the operation of steps (3) to (12) already described is executed, and the sausage S is suspended from the stick T.

If the suspension of the sausage S from the hooks 22 is executed in such a procedure, it is possible to reduce the chances of reaching the maximum number of loops during the stuffing into the natural intestine casing CS, and the number of times of cutting and separation of the sausage loops SL formed with the ensuing loop group LG is hence reduced, thereby making it possible to reduce the processing operation time for the operator P and increase productivity.

By changing the manner of control by the controller 50, the above-described apparatus of the embodiment of the invention can be changed to a configuration in which the loop group LG is discharged from the conveyor 20 during the movement of the wrapping connector moving body 21 of the conveyor 20. With this changed apparatus, even during the time when the loop group LG suspended from the hook group G is removed from the hook group G, the hooks 22 move in the downstream direction A. Namely, the wrapping connector moving body 21 is moving.

Referring to FIGS. 2A, 2B, 6A, and 6B, with the above-described changed apparatus, when the last hook 22L (G1) of one moving hook group G1 reaches the carrying-out stop commanding position ST, the supply of sausage from the sausage supplying device I to the conveyor 20 is interrupted after performing the operation in the same way as the above-described apparatus of the embodiment; however, the manner of restarting the supply of sausage differs from the above-described apparatus of the embodiment. Namely, the changed apparatus is configured such that when the last hook 22L (G1) has passed the carrying-out stop commanding position ST and the first hook 22F (G2) of the ensuing hook group G2 has reached the origin position OR, the first hook position detecting means 27 issues the first hook position detection signal J2 to the controller 50, and the controller 50 causes the pump motor Mo1 and the linking chain motor Mot to be started in response to the supply command signal Y4 based on the first hook position detection signal J2, to thereby resume the supply of sausage which was interrupted.

Even if the loop group LG5 in the state of being suspended from the stick T is removed from the hook group G5 by the stick discharging member 41 while the sausage S is being supplied to the conveyor 20 during the movement of the wrapping connector moving body 21, since the hook absent zone K5 at the point of time of stick discharge is positioned above the stick discharging path 42, the first hook 22F of the hook group G1 following the hook group G5 does not collide against the stick discharging member 41 (see FIGS. 5A and 5B). Since the hook absent zone K is provided, the supply of sausage to the conveyor 20 can be carried out even during the discharging of the stick from the conveyor 20, so that the productivity of sausage manufacturing is high.

It should be noted that the present invention is not limited to the configuration in which two hook groups G are arranged in the linearly moving zone 21A of the wrapping connector moving body 21. For example, the present invention is also applicable to a configuration in which three or more hook groups G are arranged in the linearly moving zone 21A. This configuration having three or more hook groups G is effective in a case where productivity is further increased by arranging sausage end processing operators.

What is claimed is:

1. An apparatus for suspending sausage loops from hooks, comprising: a conveyor having a plurality of hooks for suspending a sausage in which a multiplicity of links are connected and an endless wrapping connector moving body on which the plurality of hooks are mounted at a predetermined pitch, wherein a plurality of hook groups each formed by a number of hooks corresponding to a maximum number of sausage loops to be suspended from a stick are provided on the wrapping connector moving body with a respective hook absent zone interposed between adjacent ones of the hook groups, wherein when the sausage which is being supplied to the conveyor is suspended from all the hooks from a first hook to a last hook of one of the plurality of hook groups provided on the wrapping connector moving body which is being moved in a downstream direction, the supply of the sausage to the conveyor is interrupted, and the sausage whose supply has been restarted after the hook absent zone moved a predetermined distance in a state in which the supply of the sausage to the conveyor is being interrupted is suspended from a first hook of an ensuing hook group following the one hook group, and wherein the hook absent zone is a section on the wrapping connector moving body between a position spaced apart one predetermined pitch toward a trailing side from the last hook of one hook group and a position spaced apart the one predetermined pitch toward a side of the one hook group from the first hook of an ensuing hook group adjacent to and following the one hook group.

2. The apparatus for suspending sausage loops from hooks according to claim 1, wherein when the supply of the sausage to the conveyor has finished in a state in which the loop group formed by loops in a number smaller than a minimum number of loops set for one hook group is suspended from the hooks of the one hook group, the movement of the wrapping connector moving body is stopped at that point of time, and when the supply of the sausage to the conveyor using an ensuing new sausage is started, the movement of the wrapping connector moving body is restarted to allow the ensuing new sausage to follow the loop group and to be suspended from the one hook group.

3. An apparatus for suspending sausage loops from hooks, comprising: a conveyor having a plurality of hooks for suspending a sausage in which a multiplicity of links are connected and an endless wrapping connector moving body on which the plurality of hooks are mounted at a predetermined pitch,
wherein a plurality of hook groups each formed by a number of hooks corresponding to a maximum number of sausage loops to be suspended from a stick are provided on the wrapping connector moving body with a respective hook absent zone interposed between adjacent ones of the hook groups,
wherein when the sausage which is being supplied to the conveyor is suspended from all the hooks from a first hook to a last hook of one of the plurality of hook groups provided on the wrapping connector moving body which is being moved in a downstream direction, the supply of the sausage to the conveyor is interrupted, and the sausage whose supply has been restarted after the hook absent zone moved a predetermined distance in a state in which the supply of the sausage to the conveyor is being interrupted is suspended from a first hook of an ensuing hook group following the one hook group, and
wherein when a preceding hook group preceding one hook group is present at a stick discharging position for removing the loop group by raising the stick inserted in the loop group suspended from the hook group, a first hook of an ensuing hook group adjacent to and following the one hook group is adapted to be positioned in a state of opposing a sausage supplying position for supplying the sausage to the conveyor.

4. The apparatus for suspending sausage loops from hooks according to claim 3, wherein when the loop group suspended from the preceding hook group preceding the one hook group is removed from the hook group by the stick which is raised, the supply of the sausage to the conveyor is restarted.

5. An apparatus for suspending sausage loops from hooks, comprising: a conveyor having a plurality of hooks for suspending a sausage in which a multiplicity of links are connected and an endless wrapping connector moving body on which the plurality of hooks are mounted at a predetermined pitch,
wherein a plurality of hook groups each formed by a number of hooks corresponding to a maximum number of sausage loops to be suspended from a stick are provided on the wrapping connector moving body with a respective hook absent zone interposed between adjacent ones of the hook groups,
wherein when the sausage which is being supplied to the conveyor is suspended from all the hooks from a first hook to a last hook of one of the plurality of hook groups provided on the wrapping connector moving body which is being moved in a downstream direction, the supply of the sausage to the conveyor is interrupted, and the sausage whose supply has been restarted after the hook absent zone moved a predetermined distance in a state in which the supply of the sausage to the conveyor is being interrupted is suspended from a first hook of an ensuing hook group following the one hook group, and
wherein the wrapping connector moving body has a revolvingly moving zone for revolvingly moving in a horizontal plane from a rearward side toward a frontward side about a rotating shaft disposed downstream of a sausage supplying position in a direction of supplying the sausage to the conveyor and a linearly moving zone for moving downstream of the revolvingly moving zone, the apparatus for suspending sausage loops from hooks further comprising: a stick discharging member which moves on a stick discharging path intersecting the linearly moving zone to lift up the stick arranged along the linearly moving zone by a stick supporting member and to discharge the stick from the conveyor; and a stick discharge detecting means for detecting the completion of stick discharging from the conveyor by the stick discharging member,
wherein when the hook absent zone adjacent to a preceding hook group preceding one hook group is present on the stick discharging path, a first hook of an ensuing hook group adjacent to and following the one hook group is arranged to be positioned on the rearward side in a state of opposing the sausage supplying position, and the first hook of the ensuing hook group is adapted to suspend the sausage whose supply to the conveyor has been restarted on the basis of a detection signal from the stick discharge detecting means.

6. An apparatus for suspending sausage loops from hooks, comprising: a conveyor having a plurality of hooks for suspending a sausage in which a multiplicity of links are connected and an endless wrapping connector moving body on which the plurality of hooks are mounted at a predetermined pitch,
wherein a plurality of hook groups each formed by a number of hooks corresponding to a maximum number of sausage loops to be suspended from a stick are provided on the wrapping connector moving body with a respective hook absent zone interposed between adjacent ones of the hook groups,
wherein when the sausage which is being supplied to the conveyor is suspended from all the hooks from a first hook to a last hook of one of the plurality of hook groups provided on the wrapping connector moving body which is being moved in a downstream direction, the supply of the sausage to the conveyor is interrupted, and the sausage whose supply has been restarted after the hook absent zone moved a predetermined distance in a state in which the supply of the sausage to the conveyor is being interrupted is suspended from a first hook of an ensuing hook group following the one hook group, and further comprising: adjusting means for adjusting a restarting timing for restarting the movement of the wrapping connector moving body with respect to a restart timing of the supply of the sausage to the conveyor.

7. A method for suspending sausage loops from hooks of an apparatus including a conveyor having a plurality of hooks for suspending a sausage in which a multiplicity of links are connected and an endless wrapping connector moving body on which the plurality of hooks are mounted at a predetermined pitch, comprising the steps of:
moving in a downstream direction the wrapping connector moving body on which a plurality of hook groups each formed by a number of hooks corresponding to a maximum number of sausage loops to be suspended from a stick are provided with a respective hook absent zone interposed between adjacent ones of the hook groups;

interrupting the supply of the sausage to the conveyor when the sausage which is being supplied to the conveyor is suspended from a last hook of one hook group having a first hook and the last hook;

restarting the supply of the sausage to the conveyor when the last hook of the one hook group suspending the sausage therefrom has moved a predetermined distance in a state in which the supply of the sausage to the conveyor is being interrupted; and suspending the sausage from the first hook of an ensuing hook group adjacent via the hook absent zone to the last hook of the one hook group upon restarting of the supply of the sausage, wherein when the supply of the sausage to the conveyor is completed before the last hook of the one hook group suspends the sausage therefrom, and the number of loop groups suspended from the one hook group at a point of time of that completion is smaller than a minimum number of loops which has been set, the movement of the wrapping connector moving body is stopped at that point of time, and the supply of the sausage to the conveyor using an ensuing new sausage is started, whereupon the movement of the wrapping connector moving body is restarted to cause the ensuing new sausage to follow the loop group and to be suspended from the one hook group.

8. A method for suspending sausage loops from hooks of an apparatus including a conveyor having a plurality of hooks for suspending a sausage in which a multiplicity of links are connected and an endless wrapping connector moving body on which the plurality of hooks are mounted at a predetermined pitch, comprising the steps of:

moving in a downstream direction the wrapping connector moving body on which a plurality of hook groups each formed by a number of hooks corresponding to a maximum number of sausage loops to be suspended from a stick are provided with a respective hook absent zone interposed between adjacent ones of the hook groups;

interrupting the supply of the sausage to the conveyor when the sausage which is being supplied to the conveyor is suspended from a last hook of one hook group having a first hook and the last hook;

restarting the supply of the sausage to the conveyor when the last hook of the one hook group suspending the sausage therefrom has moved a predetermined distance in a state in which the supply of the sausage to the conveyor is being interrupted; and suspending the sausage from the first hook of an ensuing hook group adjacent via the hook absent zone to the last hook of the one hook group upon restarting of the supply of the sausage, wherein a restart timing of the movement of the wrapping connector moving body is adjusted with respect to a point of time of restarting the supply of the sausage to the conveyor.

* * * * *